United States Patent
Bottazzi et al.

(10) Patent No.: US 9,413,418 B2
(45) Date of Patent: Aug. 9, 2016

(54) SYNCHRONIZATION OF A REAL-TIME UWB LOCATING SYSTEM

(75) Inventors: Marco Bottazzi, Ferrara (IT); Enrico Savioli, Ravenna (IT); Federico Natali, Bologna (IT); Niels Hadaschik, Nuremberg (DE); Davide Dardari, Forlì-Cesena (IT); Andrea Conti, Bologna (IT)

(73) Assignees: DATALOGIC IP TECH S.R.L., Bologna (IT); CONSORZIO NAZIONALE INTERUNIVERSITARIO PER LE TELECOMMUNICATIONI, Parma (IT); FRAUNHOFER GESELLSCHAFT ZUR FOERDERUNG DER ANGEWANDTEN FORSCHUNG E. V., Munich (DE)

( * ) Notice: Subject to any disclaimer, the term of this patent is extended or adjusted under 35 U.S.C. 154(b) by 0 days.

(21) Appl. No.: 14/411,297
(22) PCT Filed: Jul. 12, 2012
(86) PCT No.: PCT/IT2012/000215
§ 371 (c)(1),
(2), (4) Date: Dec. 24, 2014
(87) PCT Pub. No.: WO2014/009981
PCT Pub. Date: Jan. 16, 2014

(65) Prior Publication Data
US 2015/0200706 A1  Jul. 16, 2015

(51) Int. Cl.
H03K 7/04 (2006.01)
H03K 7/06 (2006.01)
(Continued)

(52) U.S. Cl.
CPC ........... *H04B 1/7073* (2013.01); *G01S 7/40* (2013.01); *G01S 13/0209* (2013.01); *G01S 13/75* (2013.01); *H04B 1/707* (2013.01); *H04B 1/7183* (2013.01); *G01S 13/878* (2013.01)

(58) Field of Classification Search
CPC ............... H04B 1/707; H04B 1/7075; H04B 2201/709709; H04B 2201/70703; H04B 1/7085; H04J 13/00; H04J 3/0685; H04J 3/0688; H04J 3/0638; G06F 1/10; H04L 7/0008; H04L 7/043; H04L 7/042
USPC .................. 375/130–153, 219–223, 354–376
See application file for complete search history.

(56) References Cited

U.S. PATENT DOCUMENTS 6,054,950 A * 4/2000 Fontana .................. G01S 5/14
342/463
6,133,876 A * 10/2000 Fullerton ................ G01S 13/42
342/132

(Continued)

FOREIGN PATENT DOCUMENTS

WO  WO 2009/106964 A2  9/2009

OTHER PUBLICATIONS

Dardari, et al., "Ranging With Ultrawide Bandwidth Signals in Multipath Environments," Proceedings of the IEEE, vol. 97, No. 2, Feb. 2009, pp. 404-426.
(Continued)

*Primary Examiner* — James M Perez

(57) ABSTRACT

In a UWB real time locating system, UWB readers (12) are synchronized by adjusting a clock of a UWB slave reader (12) until the UWB reader (12) receives each UWB pulse (34) of a sequence of UWB pulses (34) having a predetermined pulse period (Tp) and encoding a master UWB reader unique identifier at an expected time slot (35) within each predetermined pulse period (Tp), the expected time slot (35) being related to the distance between the UWB tag reader (12) and a master UWB reader (12).

24 Claims, 16 Drawing Sheets

Figure 1:
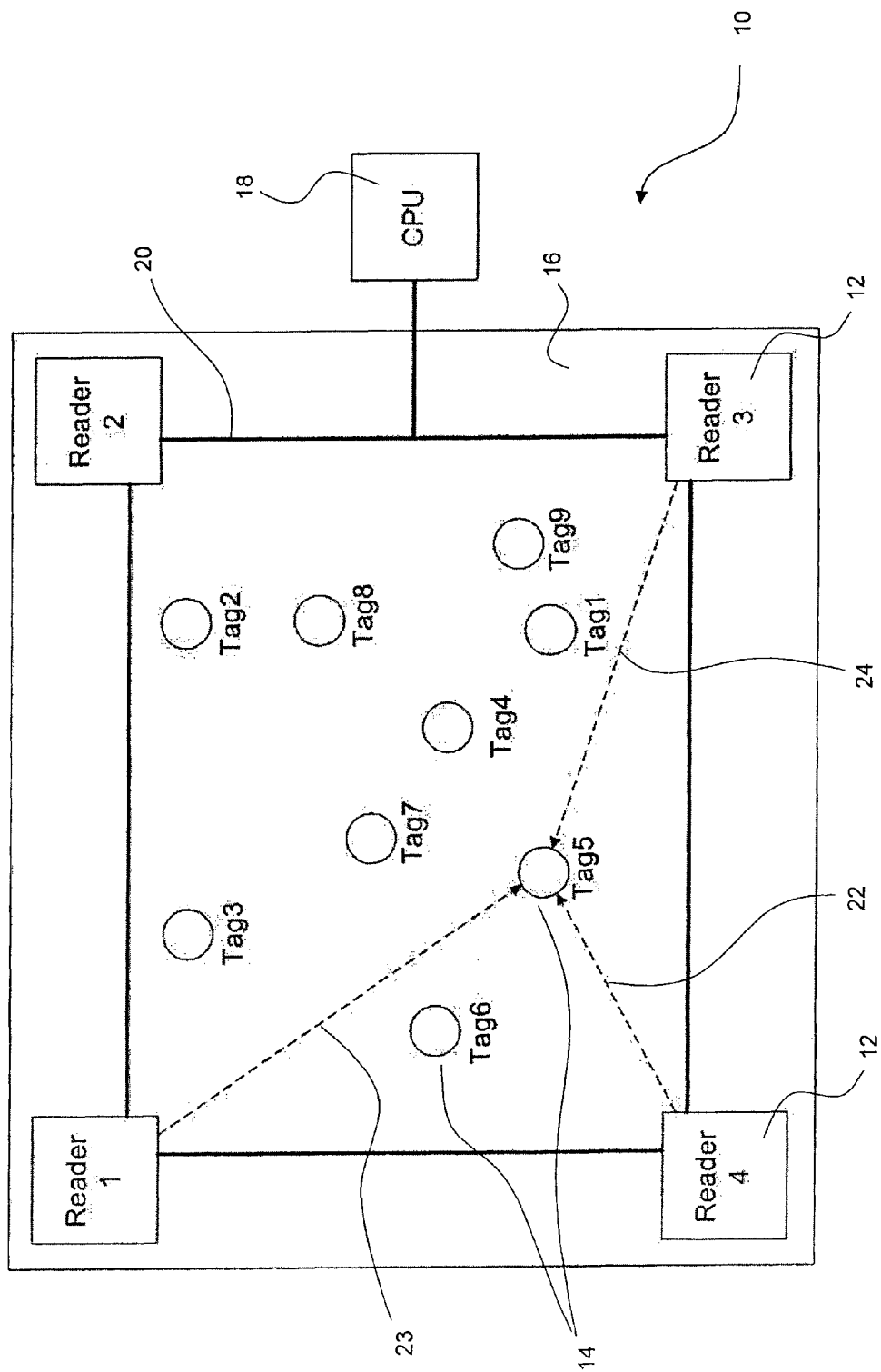

(51) Int. Cl.

| | | |
|---|---|---|
| *H03K 9/04* | (2006.01) | |
| *H03K 9/06* | (2006.01) | |
| *H04B 1/7073* | (2011.01) | |
| *G01S 7/40* | (2006.01) | |
| *G01S 13/02* | (2006.01) | |
| *G01S 13/75* | (2006.01) | |
| *H04B 1/7183* | (2011.01) | |
| *H04B 1/707* | (2011.01) | |
| *G01S 13/87* | (2006.01) | |

(56) References Cited

U.S. PATENT DOCUMENTS

| | | | | |
|---|---|---|---|---|
| 7,088,795 | B1* | 8/2006 | Aiello | H04B 1/7183 375/130 |
| 7,453,373 | B2* | 11/2008 | Cumeralto | H04Q 9/00 340/870.02 |
| 7,787,516 | B2* | 8/2010 | Kim | H04B 1/7183 375/131 |
| 7,835,327 | B2* | 11/2010 | Hahm | H04B 1/708 370/335 |
| 8,031,690 | B2* | 10/2011 | Aiello | H04W 56/0015 370/329 |
| 8,674,808 | B2* | 3/2014 | Jantunen | G06K 7/0008 235/375 |
| 2002/0130809 | A1* | 9/2002 | Kim | G01S 13/0209 342/125 |
| 2002/0143666 | A1* | 10/2002 | Finn | G06Q 10/08 705/28 |
| 2003/0028286 | A1* | 2/2003 | Glenn | B25J 9/1689 700/245 |
| 2006/0291537 | A1* | 12/2006 | Fullerton | G01S 7/4052 375/145 |
| 2008/0075153 | A1* | 3/2008 | Roberts | H04L 25/4902 375/220 |
| 2009/0034589 | A1* | 2/2009 | Hahm | H04B 1/7075 375/150 |
| 2011/0051847 | A1* | 3/2011 | Flury | H04L 7/0054 375/316 |
| 2011/0140970 | A1* | 6/2011 | Fukagawa | G01S 13/765 342/458 |
| 2011/0142174 | A1* | 6/2011 | Park | H04B 1/7183 375/340 |
| 2011/0274141 | A1* | 11/2011 | Jantunen | H04B 1/7183 375/138 |
| 2013/0051507 | A1* | 2/2013 | Jantunen | G06K 7/10306 375/356 |
| 2013/0154836 | A1* | 6/2013 | Derrico | G01S 5/0273 340/572.1 |

OTHER PUBLICATIONS

Federal Communications Commission, "FCC 02-48 ET Docket 98-153—First Report and Order, In the matter of Revision of Part 15 of the Commission's Rules Regarding Ultra-Wideband Transmission Systems," released Apr. 22, 2002, 118 pages.

IEEE Instrumentation and Measurement Society, "IEEE Standard for a Precision Clock Synchronization Protocol for Networked Measurement and Control Systems," IEEE Std 1588TM-2008 (Revision of IEEE Std 1588-2002), Jul. 24, 2008, 289 pages.

Masson, et al., "A 1 nJ/b 3.2-to-4.7 GHz UWB 50 Mpulses/s Double Quadrature Receiver for Communication and Localization," 2010 Proceedings of the ESSCIRC, Sep. 2010, pp. 502-505.

* cited by examiner

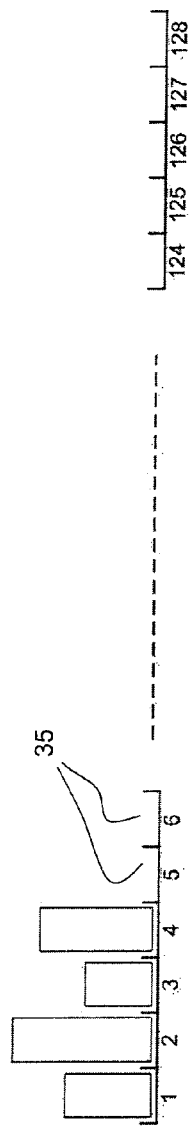
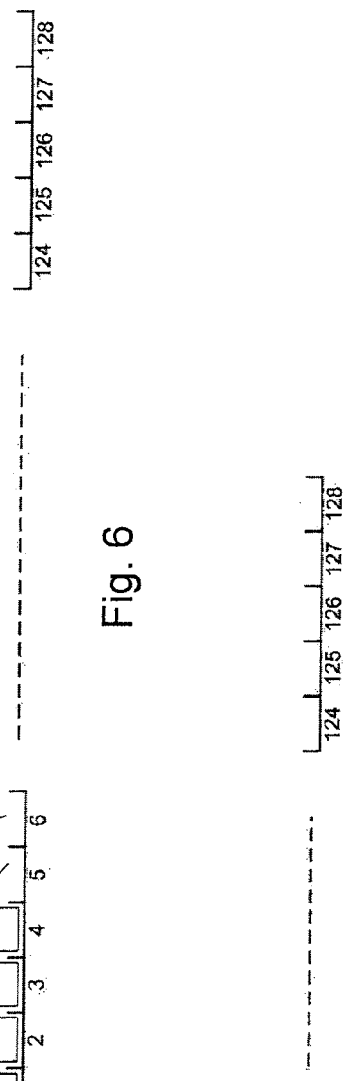
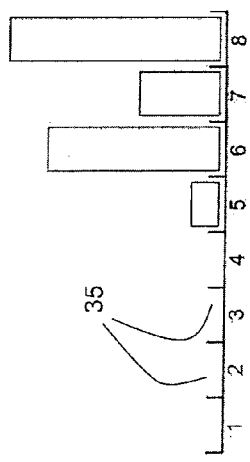
Fig. 6
Fig. 7
Fig. 8
Fig. 13

SYNCHRONIZATION OF A REAL-TIME UWB LOCATING SYSTEM

This application is a national phase entry and claims priority under 35 U.S.C. §365(a) of International Application No. PCT/IT2012/000215, filed Jul. 12, 2012.

The present disclosure relates to the synchronization of a real-time UWB locating system.

Herein, under UWB—Ultra-Wide Band a transmission from an antenna for which the emitted signal bandwidth exceeds the lesser of 500 MHz or 20% of the center frequency is meant (as currently defined by the Federal Communications Commission (FCC)).

UWB communication systems in general employ very narrow (pico-second to nano-second) radio frequency (RF) pulses to transmit and receive information. The short duration of such ultra-wideband pulses leads to very wide bandwidth (in the range of GHz), usually with a low power spectral density (PSD).

Because of the low power spectral density, UWB pulses reside below the noise floor of a typical narrowband receiver. Therefore they are undetectable from background noise in most cases and only the intended receiver is able to detect them. The low PSD enables UWB signals to share the RF spectrum with e.g. radio services with minimal or no interference problems. Therefore, no expensive licensing of the spectrum is required by use of such UWB communication systems.

Furthermore, due to their large bandwidth and frequency diversity, the UWB pulses are less sensitive to multipath fading effects than continuous wave (CW) based signals and such UWB pulses can provide excellent time and spatial resolutions. Indeed, because the pulses are very short and have a very wide bandwidth, they have very sharp rising and falling edges, allowing the instant, when they are received, to be determined very accurately. This in turn allows the spatial resolution in a locating system to be very high, and allows the shortest path to be safely resolved against the other paths in a multipath environment.

For the above reasons, UWB communication systems are therefore attractive in several applications, including real-time locating systems—RTLSs.

A locating system, in particular a real-time locating system, tracks and possibly identifies the location of items— such as objects, persons and animals—using tags attached to the items, and devices often called readers that receive wireless signals from these tags to determine their locations, such as for supply chain management, surveillance, resource management etcetera.

Herein, under "real-time" it is meant that response times are within a predetermined time, and are negligible with respect to the rate of change of the position of the items to be located.

WO 2009/106964 discloses a method for the communication in ultra-wide bandwidth RFID (radio frequency Identification) systems comprising generating through a transceiver device an interrogation ultra-wide bandwidth signal, said signal comprising at least a sequence of equally-time spaced pulses with period Ts, transmitting said signal to at least one RFID identification device, processing said interrogation signal according to the information stored in said RFID device and transmitting it back to the transceiver device as response signal, receiving said response signal through said transceiver device and further processing said response signal to detect said information included in said response signal. In one embodiment, the method further comprises: coding said interrogation signal according to a numerical coding sequence that determines the polarity of each pulse of said sequence of pulses; generating, in said RFID identification device, said response signal by varying, in each period Ts of said sequence of pulses of the interrogation signal, the polarity of the pulses using said numerical coding sequence through the variation of the antenna load (backscatter modulation), so that all reflected pulses in the same period Ts have the same polarity. In another embodiment, the method further comprises: generating said sequence of pulses so that all pulses of the sequence have the same polarity; generating, in said RFID identification device, said response signal by coding said interrogation signal according to a numerical coding sequence and to the information stored in said RFID device that determines the polarity of each pulse of said sequence of pulses by varying the antenna load conditions; decoding, in said transceiver device, said response signal by modifying, in each period Ts of said sequence of pulses of the response signal, the polarity of pulses using said numerical coding sequence, so that all pulses within the same period Ts have the same polarity.

Masson, G. et al., "A 1 nJ/b 3.2-to-4.7 GHz UWB 50 Mpulses/s Double Quadrature Receiver for Communication and Localization", paper number 978-1-4244-6664-1/10, IEEE, 2010, pages 502-505 discloses a rake-like receiver that may be used in a system according to the present disclosure.

Dardari, D. et al., "Ranging With Ultrawide Bandwidth Signals in Multipath Environments", Proceedings of the IEEE, 97(2), 2 Feb. 2009, pages 404-426 discloses search back algorithms that may be used in a system according to the present disclosure.

A critical issue of a real-time locating system is the synchronization between the system elements, in particular between the readers. The locating performance of an RTLS strongly depends on the accuracy of the synchronization of the readers.

In the general field of UWB communication systems and not dealing with real-time locating systems, US 2011/0051847 A1 discloses a method for estimating and correcting a frequency offset between a local clock of a receiving transceiver and a remote clock of a corresponding emitting transceiver, said receiving transceiver receiving from the emitting transceiver electromagnetic signals that lack a continuous sinusoidal carrier, said method comprising the steps of: receiving by said receiving transceiver, a signal emitted by the emitting transceiver, said signal lacking a continuous sinusoidal carrier and being formed of at least one symbol, each symbol being emitted within a time frame having a first duration; sampling the said received signal by taking for each frame a set of energy measurements of said received signal; forming a matrix representative of said energy measurements; determining from said energy matrix, points of maximum energy within each of said time frames; determining a straight line connecting a plurality of said points of maximum energy; determining a slope of said straight line; calculating a frequency offset between the clock of the emitting transceiver and the clock of the receiving transceiver by using the slope of said straight line; adjusting the frequency of the receiving transceiver's clock according to the calculated frequency offset.

The Applicant notes that the above method requires a non-negligible computational effort, that in particular may not suit the requirements of a simple reader of tags in a real-time locating system.

Again in the general field of UWB communication systems and not dealing with real-time locating systems, U.S. Pat. No. 8,031,690 B2 discloses an ultra-wide band communication network comprising a master device; a plurality of slave devices structured to communicate with the master device using a plurality of ultra wide band pulses; a medium access control protocol comprising a time division multiple access (TDMA) frame, the time division multiple access frame comprising a first mode for protocol exchange and a second mode for data exchange; wherein the time division multiple access frame comprises a synchronization frame section, a protocol message exchange section, and a plurality of data sections; wherein the time division multiple access frame comprises a start-of-frame section, a command section, and a plurality of data sections; and wherein the start-of-frame section synchronizes a clock in the slave device with a clock in the master device.

Finally, again in the general field of UWB communication systems and not dealing with real-time locating systems, U.S. Pat. No. 7,088,795 B1 discloses a UWB transceiver that may operate in a networked environment in which a network of transceiver node devices comprise a first slave transceiver having a receiver configured to receive spread spectrum signals, and a second slave transceiver configured to communicate with the first slave transceiver. Additionally, a master transceiver is in communication with the first slave transceiver and the second slave transceiver. The master transceiver is configured to manage data transmissions and synchronization between the first slave transceiver and the second slave transceiver. Data transmissions within the network are provided in TDMA defined frames which each include a synchronization slot associated with the leading edge of each frame, and which is provided by the master transceiver of the network according to its internal master clock. The synchronization slot includes a master synchronization code which is generated at least once per frame. Preferably, the master synchronization code comprises a unique bit pattern which identifies the master transceiver as the source of transmission with timing information associated with the master clock in the clock synchronization unit of the master transceiver. Clock recovery function in the slave transceiver device identifies synchronization slot for incoming data frames and synchronizes the local clock of the slave transceiver device. Additionally, data synchronization sub-slots are used by each transceiver for providing timing synchronization signals to corresponding target transceivers in order to accommodate for propagation delays between the source and target transceivers.

The Applicant notes that the last two commented documents employ TDMA within a hierarchical, master/slave communication network, that in particular may not suit the requirements of a real-time locating system.

The technical problem at the basis of the present disclosure is to allow enough precise synchronization of a real-time UWB locating system, in a simple, versatile and inexpensive manner.

The Applicant perceived in particular that in a real-time UWB locating system, the above problem can be solved by exploiting the fact that in order to interrogate the tags, the readers of a UWB locating system should transmit UWB pulses periodically and with a precise timing, and that these UWB pulses are also received by other readers; this can be exploited by having some of the readers use the UWB pulses transmitted by an elected reader ("master reader" hereinbelow) as a reference timing to adapt their clock to that of said elected reader.

In a first aspect, the disclosure relates to a UWB tag reader comprising:
 a memory storing a quantity representative of the distance between the UWB tag reader and a master UWB reader, and a master UWB reader unique identifier,
 a clock providing a reference clock signal that drives the UWB communication activity, the activity being based on a periodic transmission of a plurality of UWB pulses encoding an information, having a predetermined pulse period, and
 a clock adjuster that adjusts the reference clock signal until the UWB reader receives each UWB pulse of a sequence of UWB pulses having the predetermined pulse period and encoding the master UWB reader unique identifier at an expected time slot within each predetermined pulse period, the expected time slot being related to the distance between the UWB tag reader and a master UWB reader.

In an embodiment, the master UWB reader unique identifier is a spreading code uniquely associated with the master UWB reader, so that a CDMA technique is used.

In another embodiment, the master UWB reader unique identifier is embedded in an information packet transmitted by the master UWB reader, so that a CSMA-CA technique is used.

Preferably, the clock provides a clock signal on which a chip period divided into time slots is based, and the clock adjuster adjusts the clock signal until the UWB reader receives each UWB pulse of a sequence of UWB pulses having the predetermined pulse period and encoding the master UWB reader spreading code at an expected time slot within each of a plurality of chips.

Preferably the clock adjuster adjusts the clock signal by shifting it by one time slot every information bit transmission.

Preferably the UWB pulses having the predetermined pulse period and encoding the master UWB reader spreading code comprise a plurality of successive equal pulses for each chip of the master device spreading code.

Preferably the UWB reader comprises a receiving module configured to receive UWB pulses having the predetermined pulse period and to check whether they encode the master UWB reader unique identifier.

Preferably the UWB reader comprises a receiver module configured to monitor at least one time slot each chip period and to accumulate energy of UWB pulses received in each of said at least one time slot for each chip of the master UWB reader spreading code.

Preferably the UWB reader comprises a tag interrogation module and the clock adjuster is operated concurrently with or alternately with the tag interrogation module.

Preferably the tag interrogation module comprises a transmitter of UWB pulses having the pulse period and encoding a UWB reader's own unique identifier.

Preferably the receiver module is further adapted to check whether the received UWB pulses having the predetermined pulse period encode the UWB reader's own unique identifier and modulated with a unique identifier of a tag.

Preferably the clock adjuster comprises an input of a coarse synchronization signal.

In another aspect the disclosure relates to a real-time UWB locating system comprising at least one UWB reader as detailed above and at least one further UWB reader comprising a transmitter of UWB pulses having the predetermined pulse period and encoding the master UWB reader unique identifier.

Preferably the at least one further UWB reader cyclically transmits a series of sequences of UWB pulses having the predetermined pulse period and encoding the master UWB reader unique identifier.

Preferably the real-time UWB locating system further comprises at least one tag comprising an antenna for backscattering UWB pulses, and a module configured to periodically set an antenna load according to a tag unique identifier, wherein the unique identifiers are spreading codes and a setting period corresponds to a chip period.

Preferably each tag further comprises a module configured to periodically set an antenna load according to an information packet including a tag ID, a setting period corresponding to a symbol period integer multiple of a chip period.

In another aspect, the disclosure relates to a UWB real-time locating system synchronization method comprising the steps of:
cyclically transmitting from a master UWB reader a sequence of UWB pulses having a predetermined pulse period and encoding a master UWB reader unique identifier,
receiving at a slave UWB reader UWB pulses,
providing at the slave UWB reader a reference clock signal that drives the UWB communication activity, the activity being based on a periodic transmission of a plurality of pulses encoding an information, having a predetermined pulse period (Tp), and,
adjusting the reference clock signal at the slave UWB reader until the slave UWB reader receives each UWB pulse of the sequence of UWB pulses having the predetermined pulse period and encoding the master UWB reader unique identifier at an expected time slot within each predetermined pulse period, the expected time slot being related to a distance between the slave UWB reader and a master UWB reader.

Preferably said unique identifiers are spreading codes and the step of adjusting comprises shifting the clock signal by a duration of one time slot every information bit transmission.

Preferably the method comprises a preliminary step of communicating to the slave UWB reader a coarse synchronization signal using a communication channel distinct from the UWB communication channel.

Preferably the communication channel uses a software-based synchronization protocol, such as the IEEE 1588 Precision Time Protocol (PTP) or the Network Time Protocol (NTP).

In an aspect the disclosure relates to a method of operating a real-time UWB locating system comprising a plurality of UWB readers and a plurality of tags, comprising the steps of:
providing to at least one UWB reader of the system a master UWB reader unique identifier and a quantity representative of the distance between the UWB reader and a master UWB reader,
periodically transmitting a tag interrogation signal from each UWB reader of the system, the tag interrogation signal comprising a predetermined number of pulses transmitted with a predetermined pulse period and encoding a UWB reader's unique code;
receiving at each UWB reader a sequence of said predetermined number of UWB pulses having the predetermined pulse period,
checking whether the received sequence encodes a master UWB reader unique identifier, and in the affirmative case adjusting a clock signal of the receiving UWB reader so that the received sequence is received at an expected time slot within each predetermined pulse period, the expected time slot being related to a distance between the UWB reader and a master UWB reader.

Preferably said unique identifiers are spreading codes and said step of periodically transmitting comprises periodically transmitting a tag interrogation packet from each UWB reader of the system, the tag interrogation packet comprising a plurality of information bits transmitted with an information bit period, each information bit being modulated by a UWB reader's own spreading code into a plurality of chips transmitted with a chip period, each chip being modulated into a predetermined number of pulses transmitted with a pulse period; and said step of checking comprises checking whether the received sequence encodes a master UWB reader spreading code, and in the affirmative case adjusting a clock signal of the receiving UWB reader so that the received sequence is received at an expected time slot within each chip, the expected time slot being related to a distance between the UWB reader and a master UWB reader.

Preferably the method further comprises checking whether the received sequence encodes the UWB reader's own unique identifier and in the affirmative case computing a distance from an item based on the time slot in which the sequence has been received.

Preferably the method further comprises receiving a plurality of UWB pulse sequences encoding the UWB reader's own unique identifier and checking whether the plurality of UWB pulse sequences further encodes a tag unique identifier and/or a tag ID.

Figure 2:
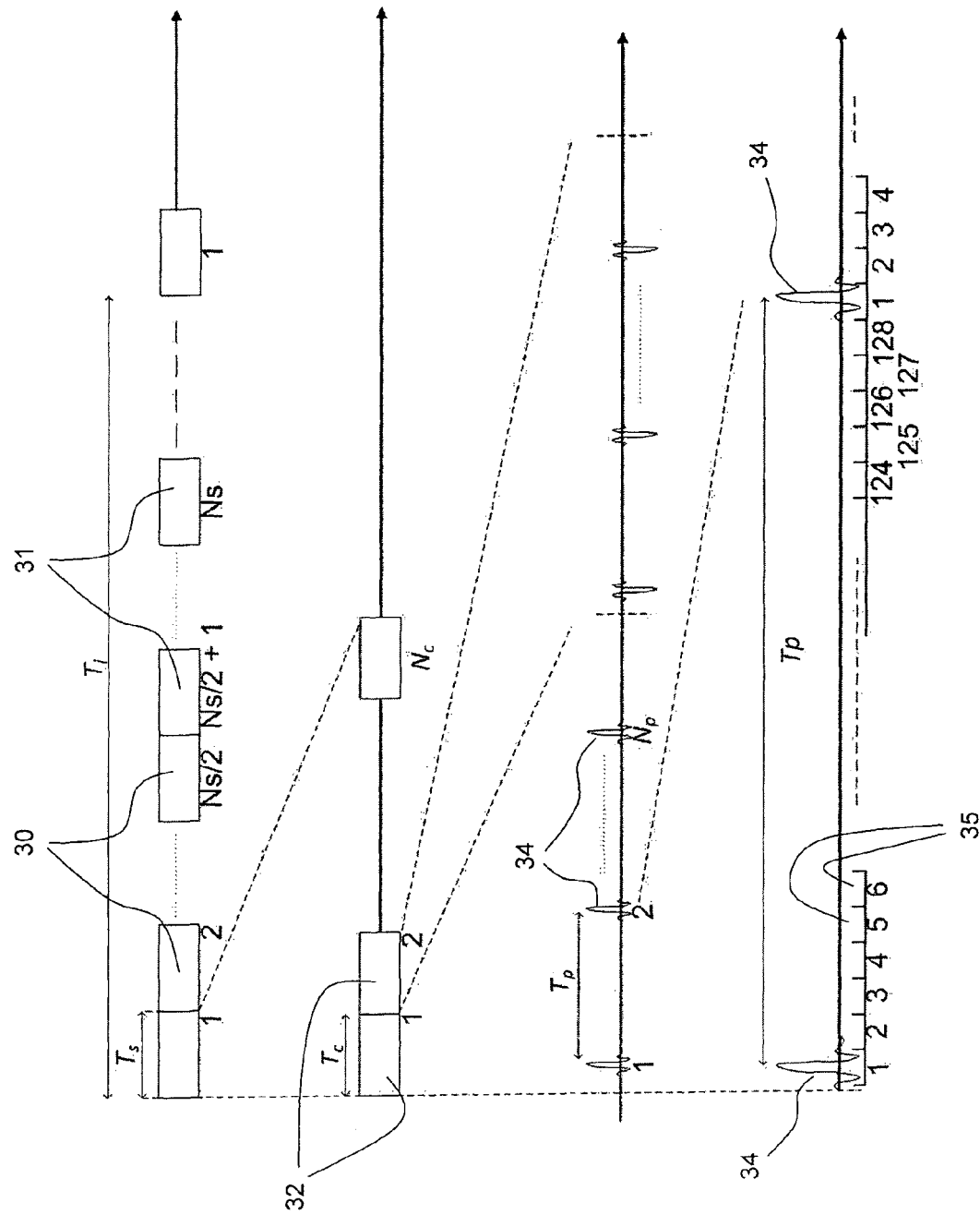
Figure 3A:
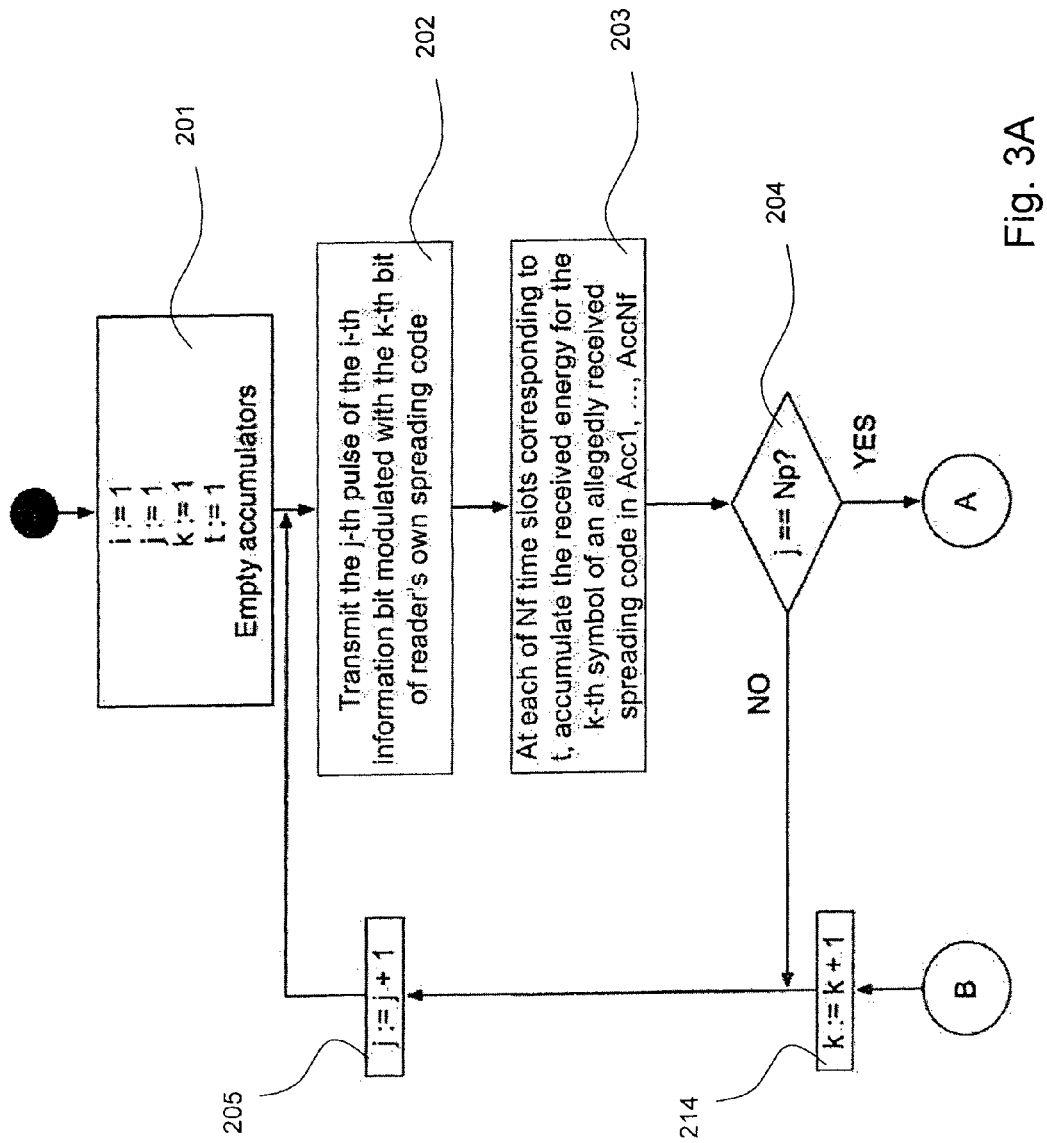
Figure 3B:
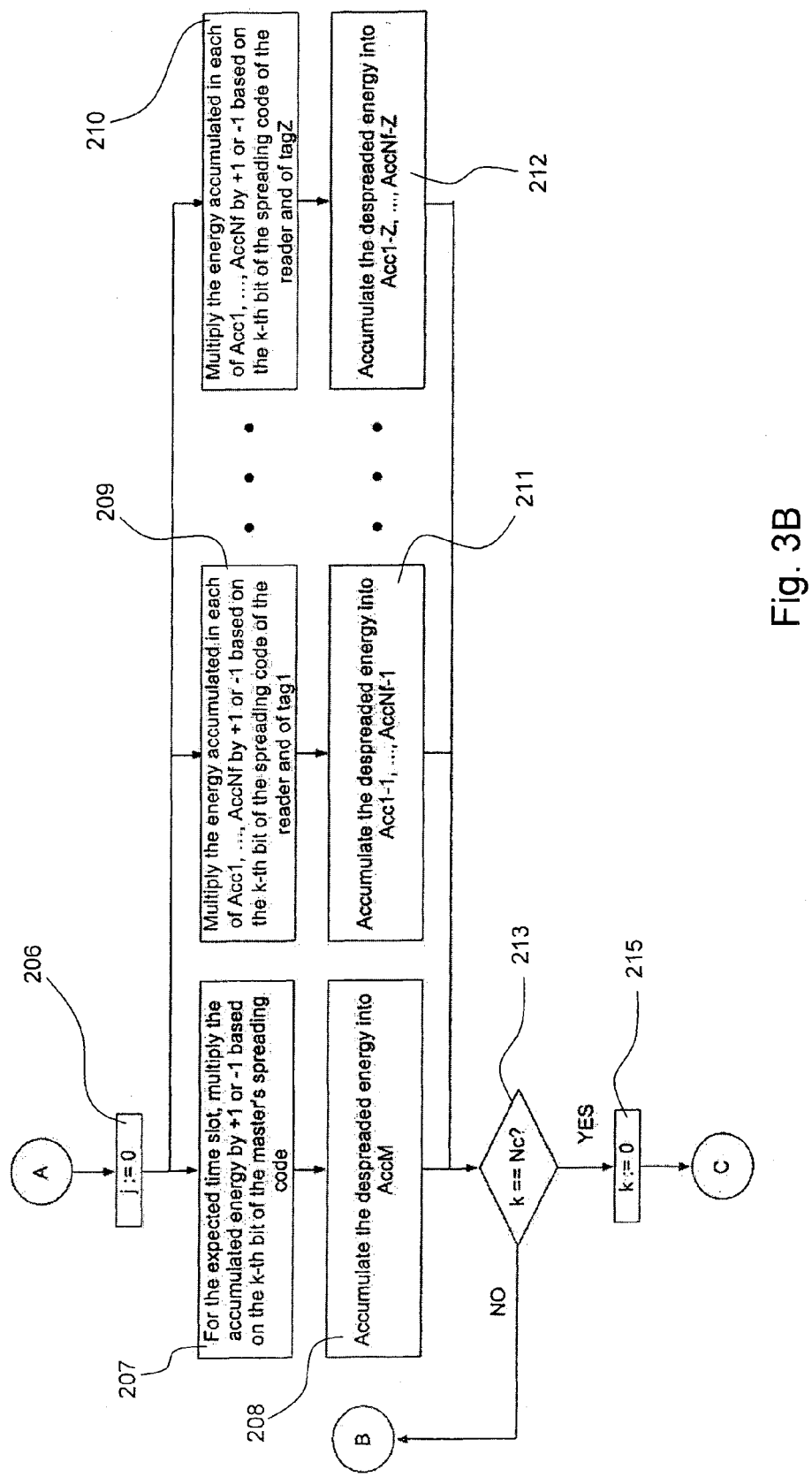
Figure 3C:
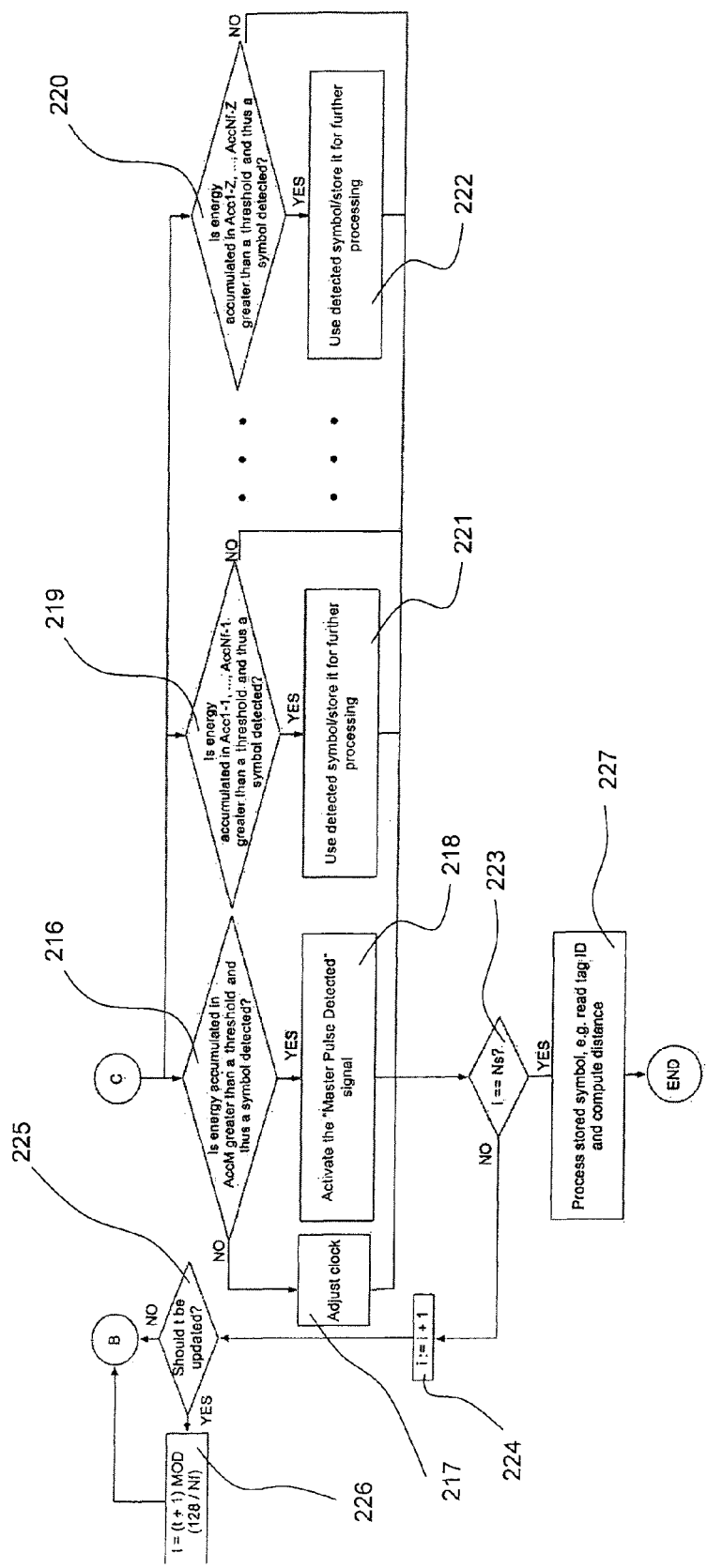
Figure 4:
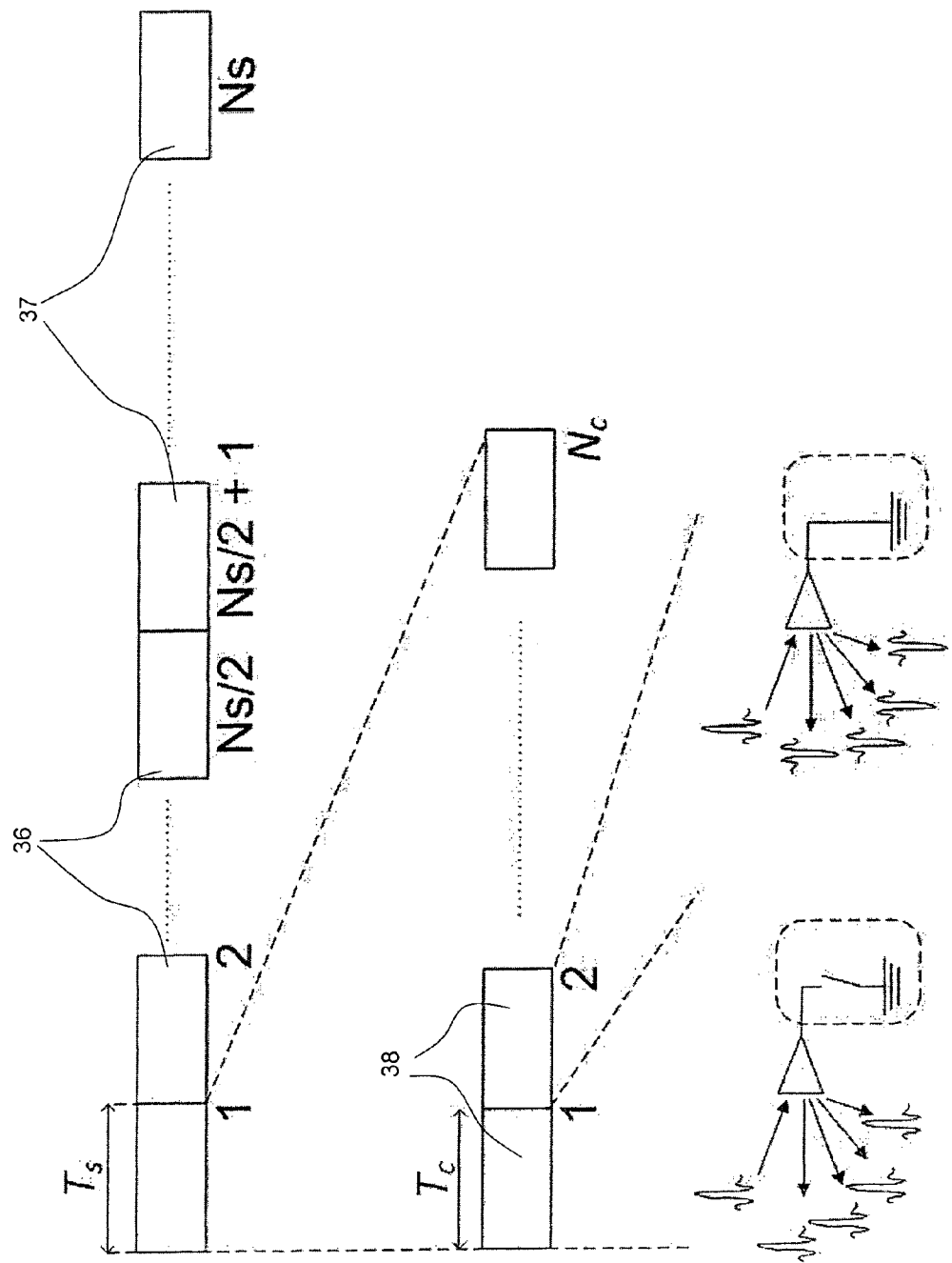
Figure 5:
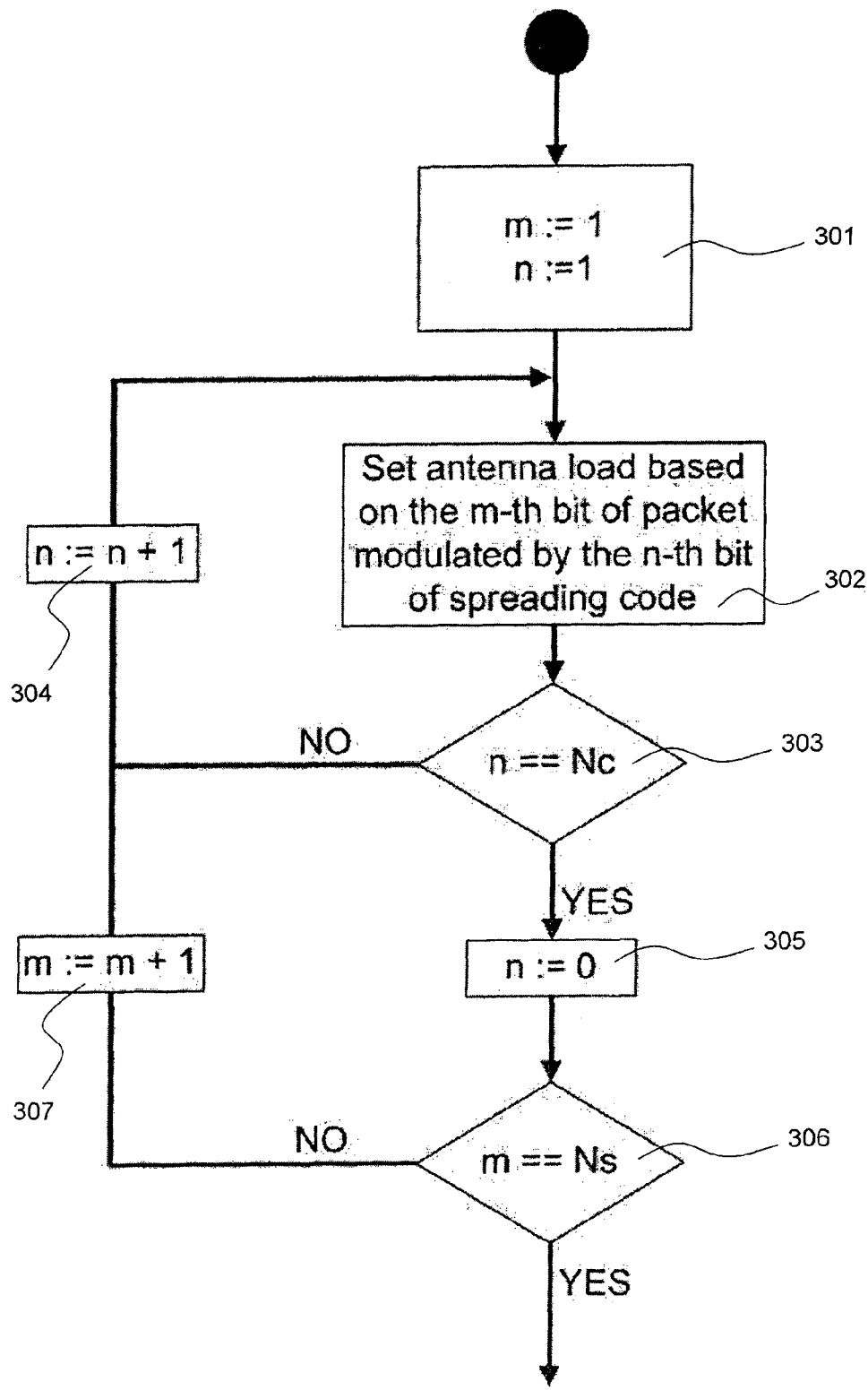
Figure 9:
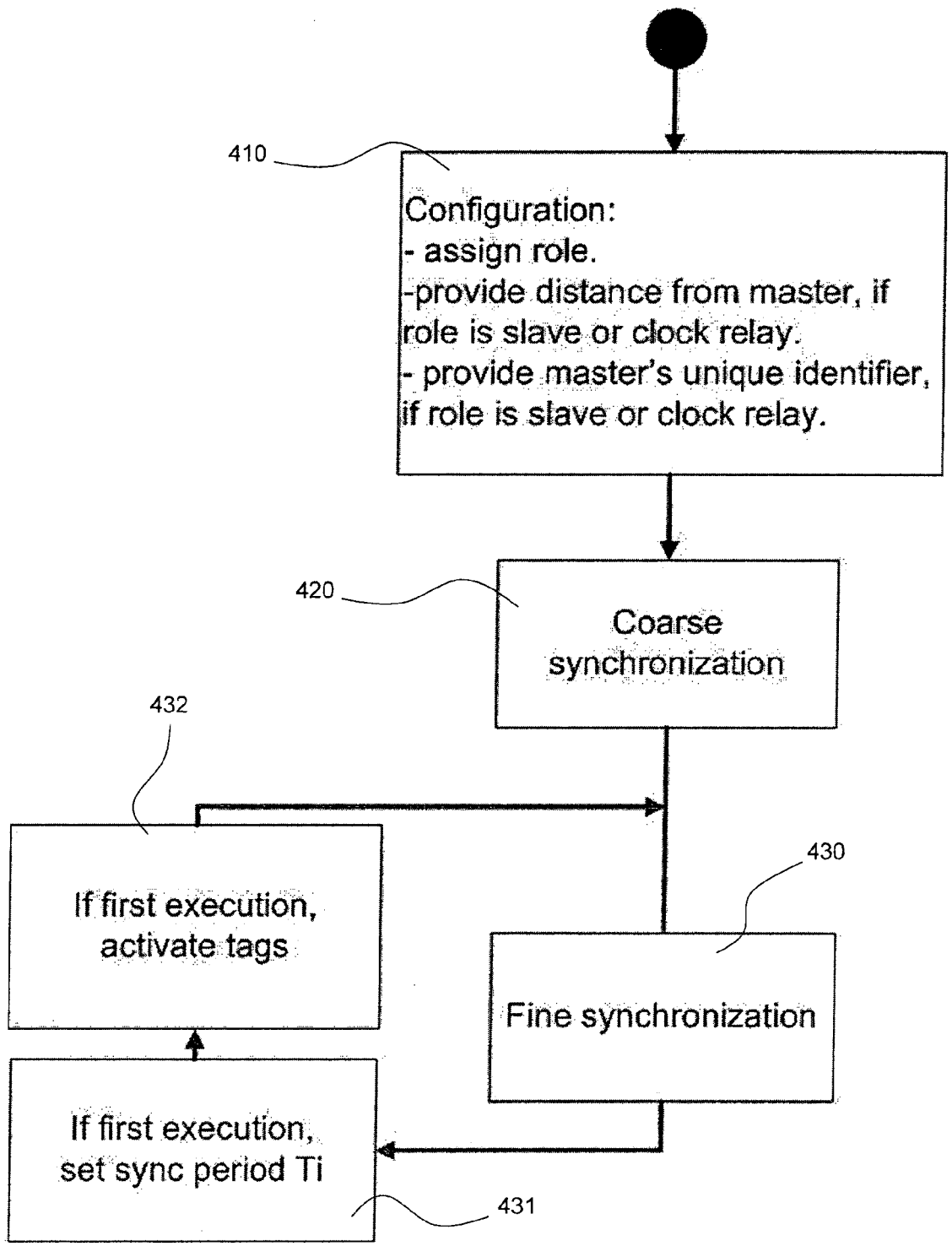
Figure 10:
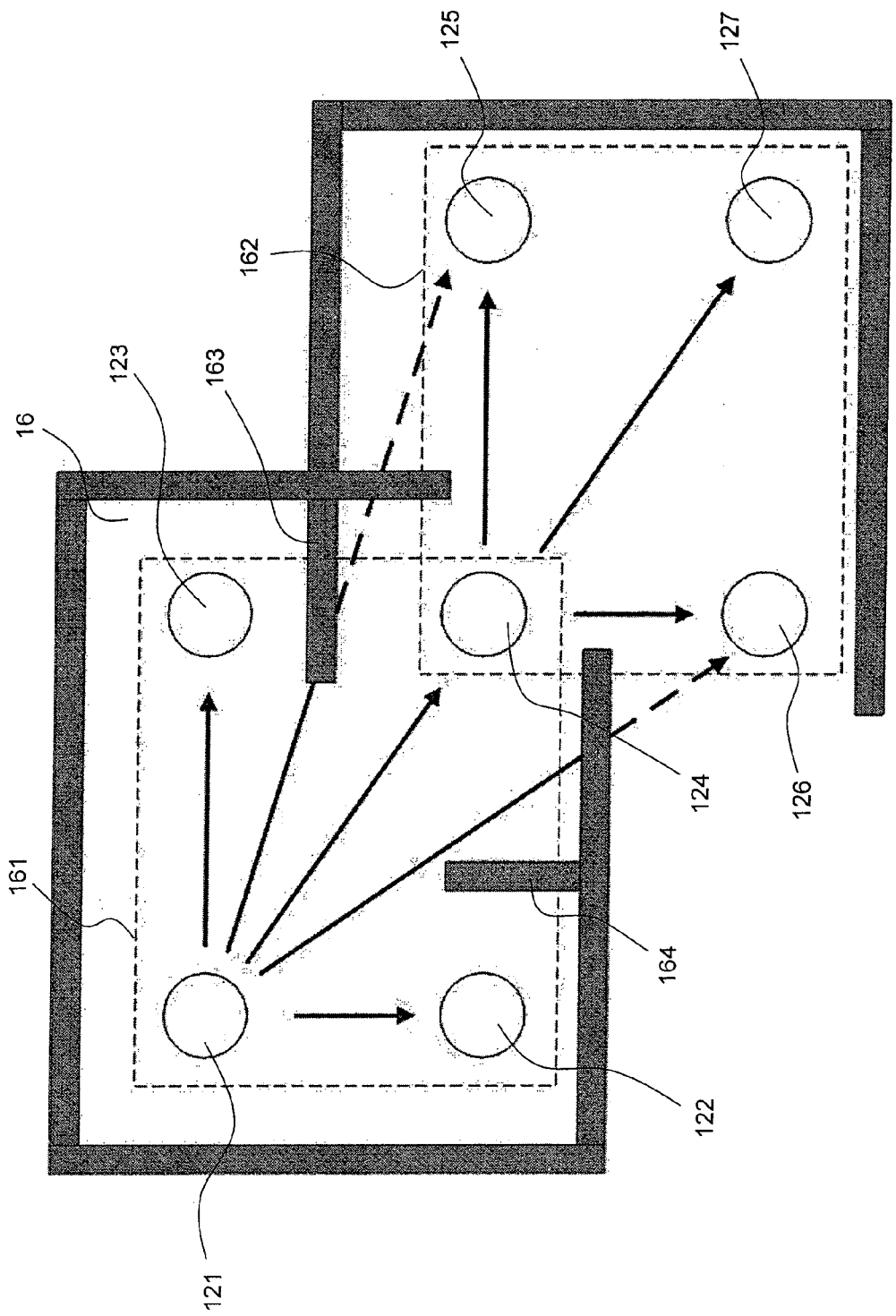
Figure 11:
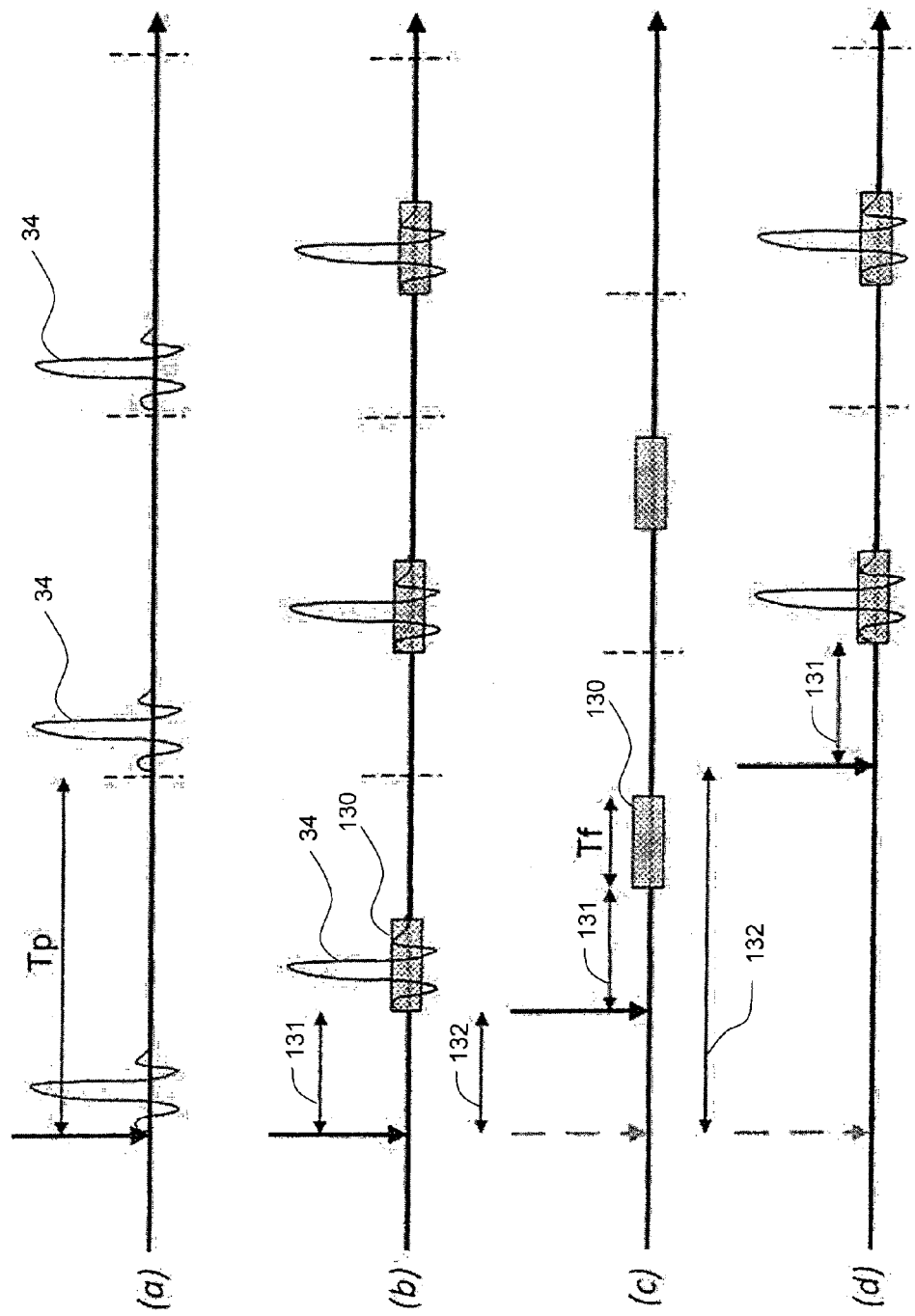
Figure 12A:
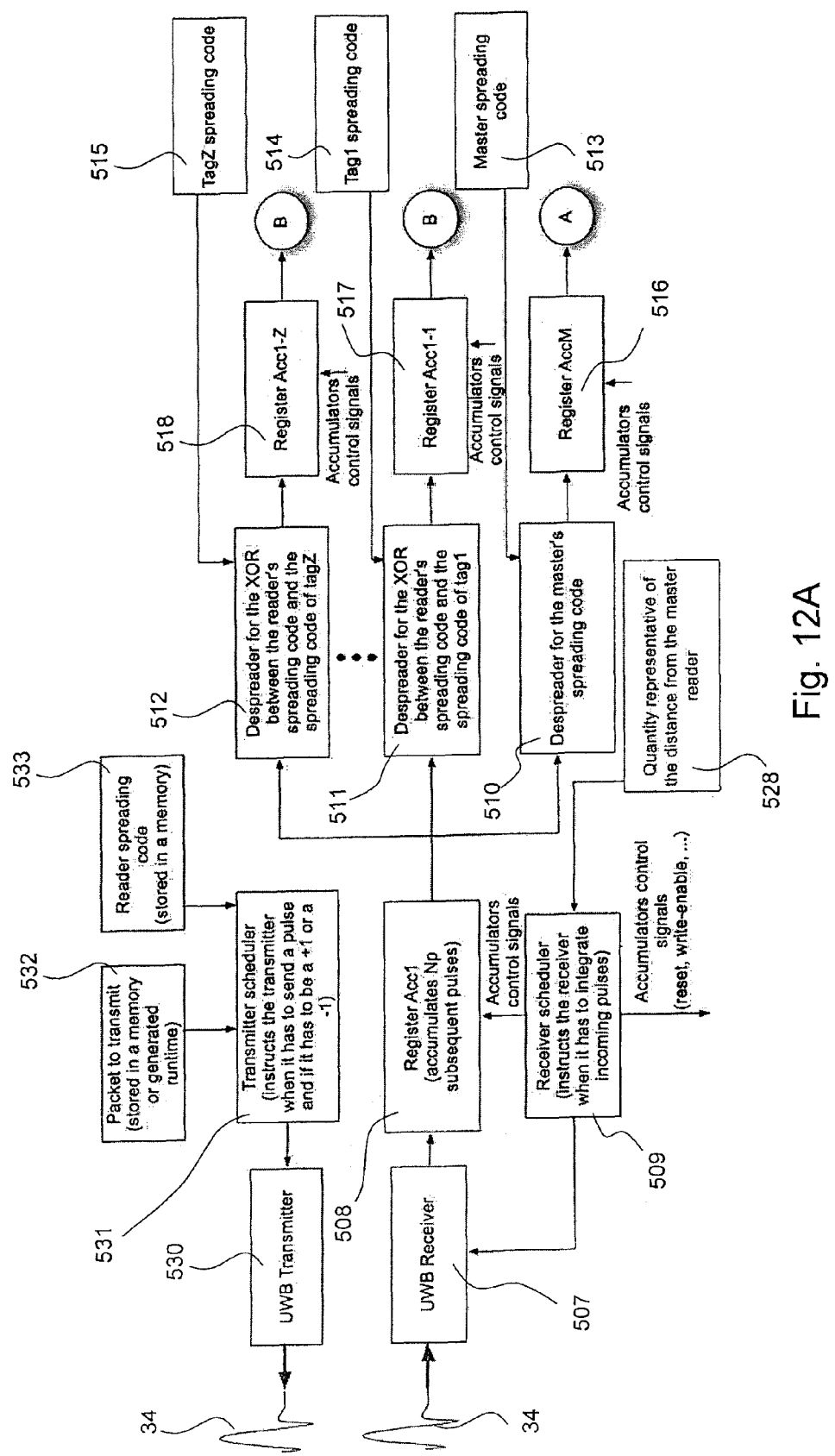
Figure 12B:
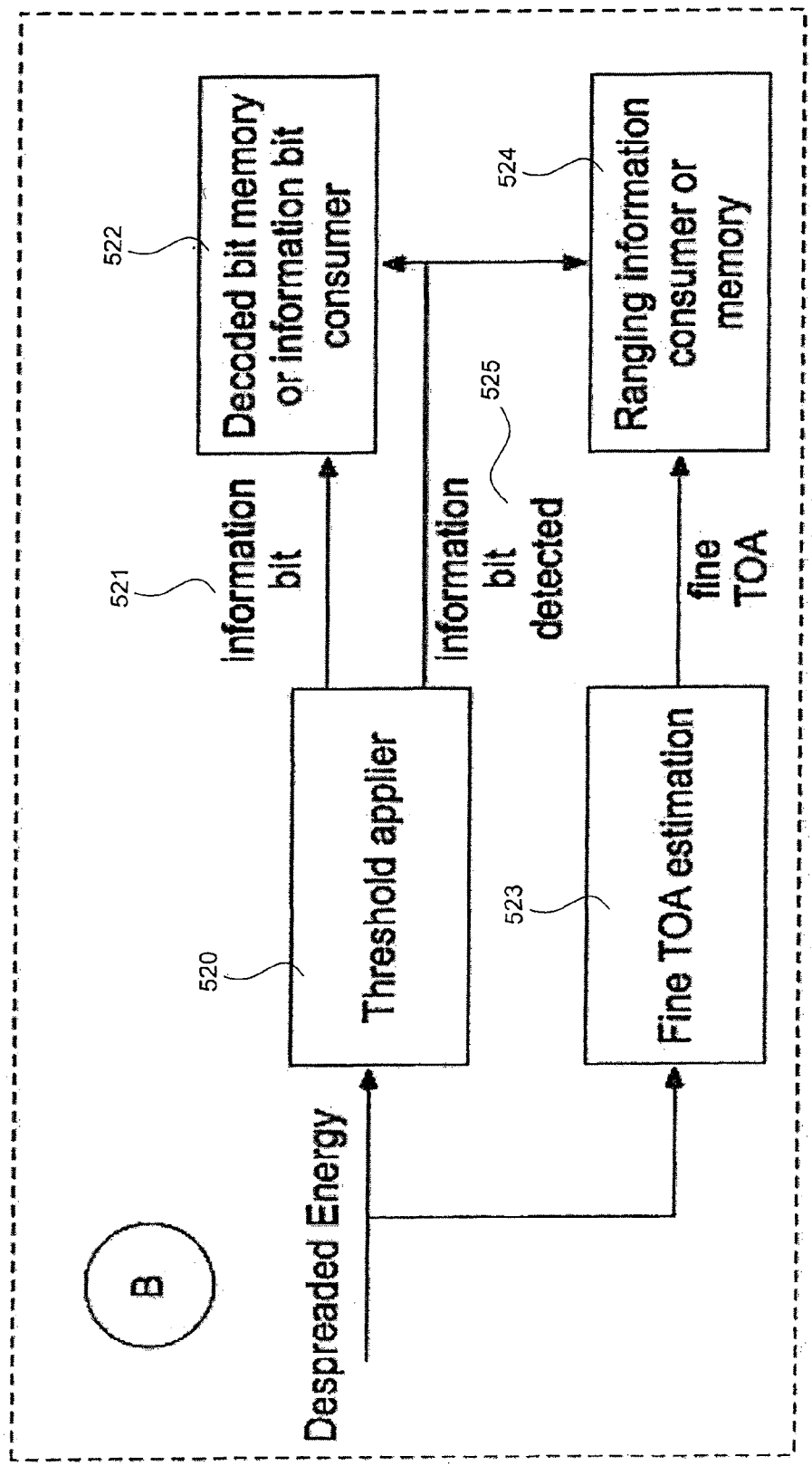
Figure 12C:
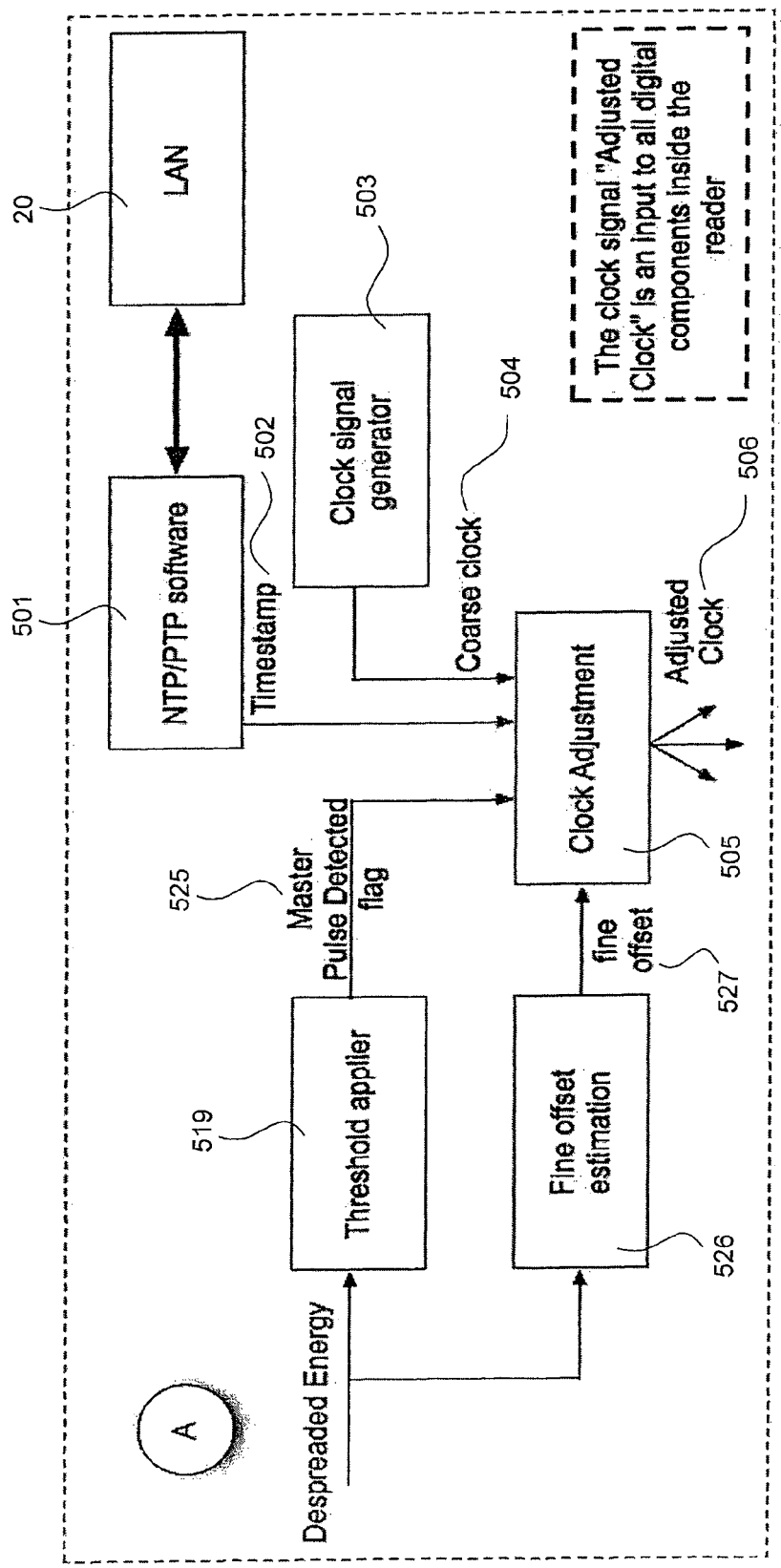
Figure 14:
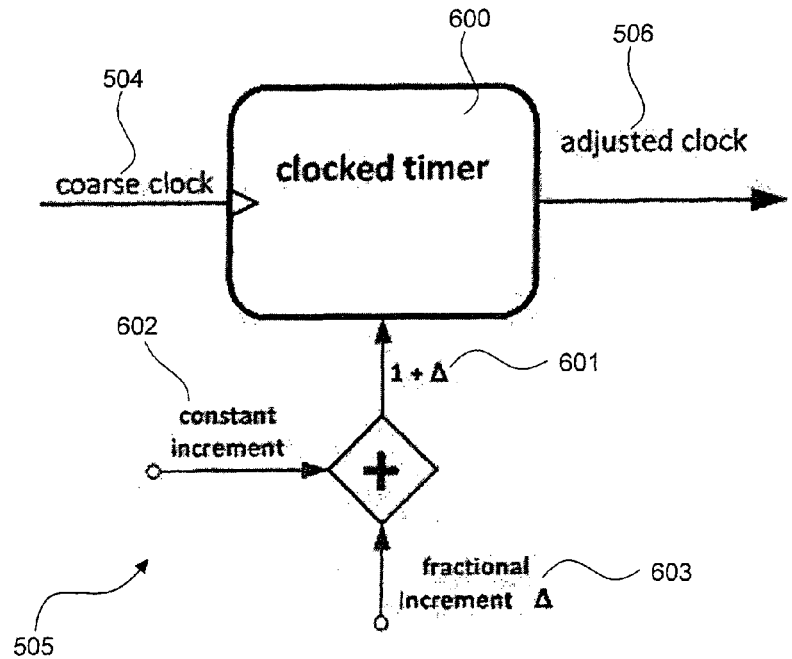
Figure 15:
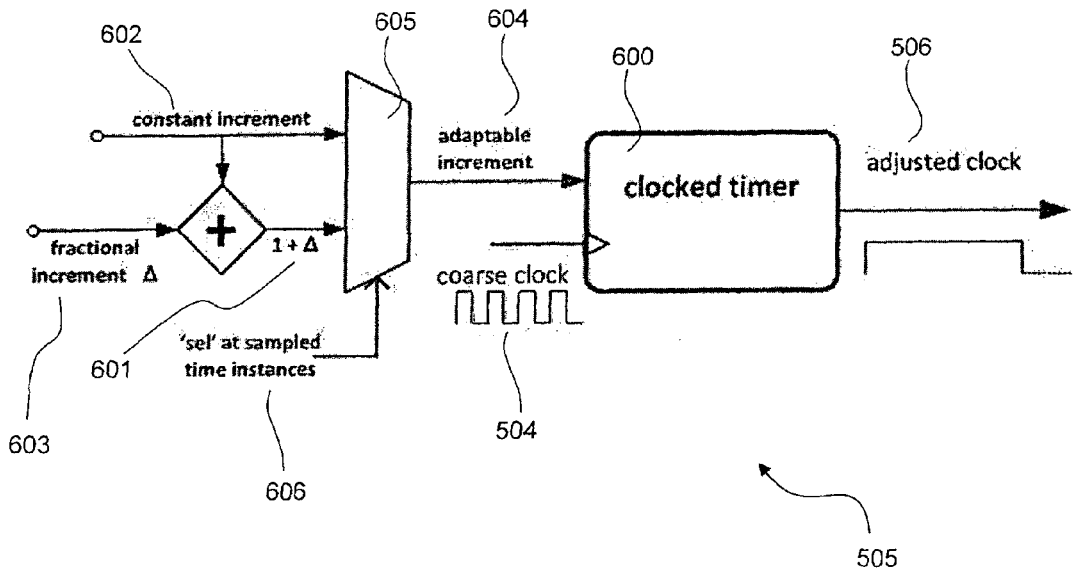
Figure 16:
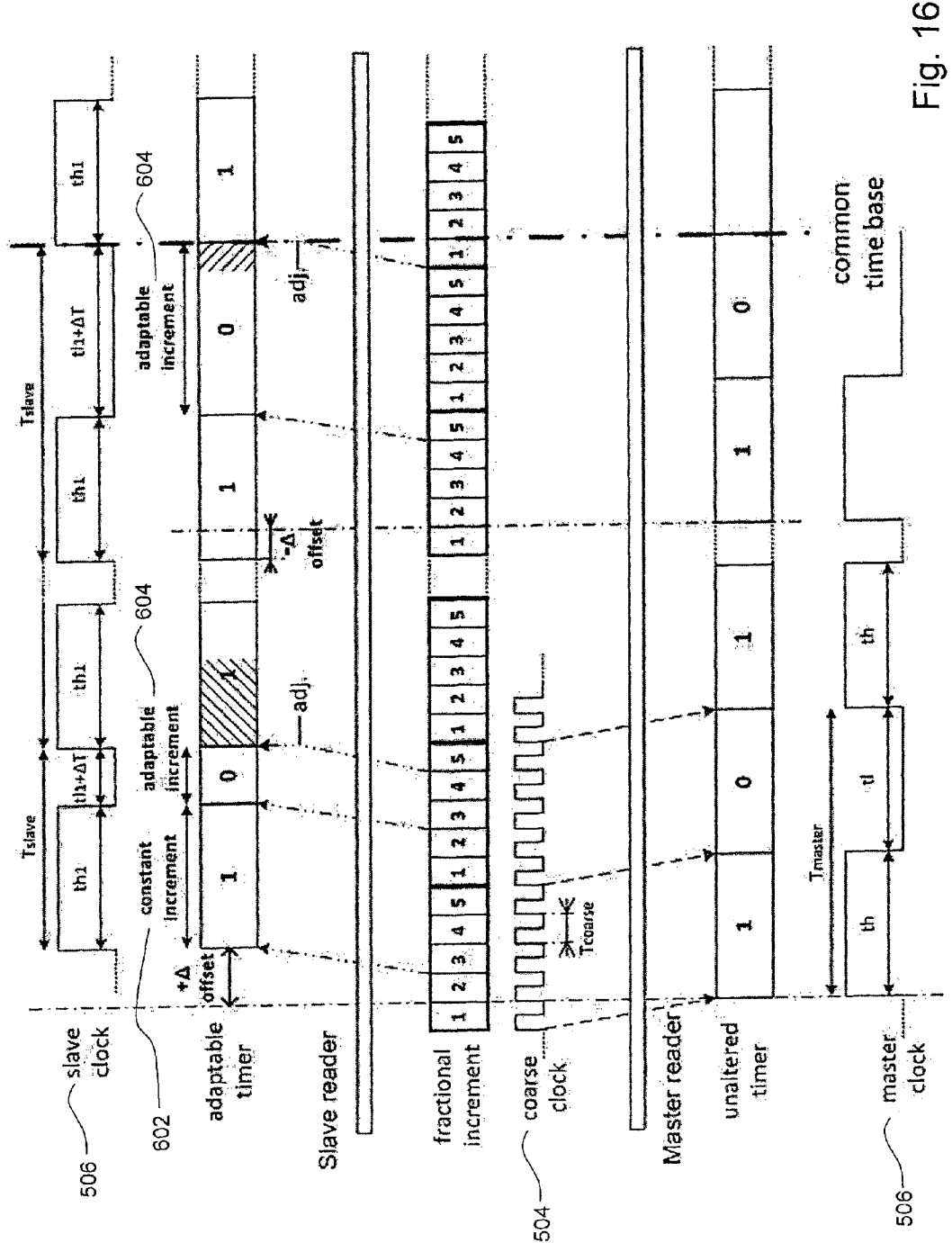

Further features and advantages of the disclosure will become clearer from the description of some preferred embodiments thereof, made with reference to the attached drawings, wherein:

FIG. 1 shows an exemplary real-time UWB locating system 10,

FIG. 2 diagrammatically shows items transmitted by a reader,

FIG. 3, split into FIG. 3A, FIG. 3B and FIG. 3C, is a flowchart of an embodiment of the operation of a reader in one interrogation cycle, FIG. 4 diagrammatically shows items transmitted by a tag, FIG. 5 is a flowchart of an embodiment of the operation of a tag in one interrogation cycle, FIGS. 6-8 diagrammatically show energy histograms, FIG. 9 is a high-level flowchart of an embodiment of a synchronization method according to the disclosure, FIG. 10 shows another exemplary real-time UWB locating system, FIG. 11 diagrammatically shows the communication of pulses and reception of same in different synchronization conditions, FIG. 12, split into FIG. 12A, FIG. 12B and FIG. 12C, is a block diagram relating to a reader according to the disclosure, FIG. 13 diagrammatically show energy histograms similarly to FIGS. 6-8, FIGS. 14-15 are block diagrams of an exemplary clock adjustment module of a reader according to the disclosure, and FIG. 16 diagrammatically shows the behavior of clock adjustment module of FIG. 15.

FIG. 1 shows an exemplary real-time UWB locating system 10. System 10 comprises a plurality of readers 12 and a plurality of tagged items 14 in an area 16, four readers 12 and nine tags 14 being shown by way of an example in FIG. 1.

Tagged items 14 are in general moving into, out of and within area 16. Locating system 10 is intended to obtain and track the position of tagged items 14 within area 16 in real-time. This may be done for any of several purposes including supply chain management, surveillance, resource management etcetera.

Readers 12 are connected to each other and/or to a CPU 18, such as by a wired or wireless network, e.g. a LAN or WLAN, as diagrammatically shown at 20. CPU 18 may also be incorporated into one of readers 12. Moreover, readers 12 and the CPU 18 may also communicate only through UWB pulses as detailed below, so that LAN 20 can also be missing.

The distance 22 from one tagged item 14 to one reader 12, also called "ranging", is obtained from the detection of the tagged item 14 by the reader 12, and the position of the tagged item 14 within area 16 is computed by the CPU 18 from three such distances 22, 23, 24 from one tagged item 14 to three readers 12, in case two-dimensional location within area 16 is desired, or from four such distances from one tagged item 14 to four readers 12, in case three-dimensional location within area 16 is desired. The computation can be performed exploiting the well-known triangulation techniques or other advanced filter techniques (Kalman filter, particle filter, etc.). Thus, a 2D locating system 10 will comprise at least three readers 12, and a 3D locating system 10 will comprise at least four readers 12 in order to determine a position unambiguously.

The ranging or distance 22 from one tagged item 14 to one reader 12 is computed, according to the disclosure and as better disclosed hereinafter, based on the propagation time or round-trip time of electromagnetic pulses traveling from a reader 12 to a tagged item 14 and/or vice versa. From the knowledge of the propagation speed of a pulse in the medium within area 16, it is possible to translate the propagation time into a distance. In particular, an electromagnetic pulse propagates at the speed of light in the absence of obstacles, hence every 1 nanosecond it covers about 0.3 meters.

According to the disclosure, the electromagnetic pulses used for computing the propagation time or round-trip time and hence the distances 22, 23, 24 in the locating system 10 are Ultra-Wide Band pulses, reaping the benefits outlined in the introductory portion of the present description.

Each tagged item 14 bears a tag which can be active, passive or semi-passive. For the sake of convenience, reference 14 will be used hereinbelow for tags as well.

An active tag 14 is equipped with a true transmitter, in particular a UWB transmitter that periodically sends to the reader(s) 12 a presence signal or "ping". This signal generally includes preamble information (or header) and payload information, such as an ID of the tag, and a timestamp. The ping is sent autonomously from the active tag 14, and collected by the readers 12.

Passive and semi-passive tags 14 cannot autonomously transmit identification signals to the reader(s) 12 since they are not provided with true transmission or reception equipment. While passive tags draw all energy required for operation from an interrogation signal coming from the reader 12 or from CPU 18 or from a dedicated device called energy harvesting system, semi-passive tags 14 have an internal battery, still do need to be awakened by the interrogation signal from the reader 12 and possibly draw energy therefrom.

In the real-time locating system 10 according to the disclosure, active tags are less preferred for reasons of economy. Accordingly, reference will be made hereinbelow to passive and semi-passive tags 14, the changes to be made in case active tags are used being sometimes indicated below and in any case fully within the skills of a skilled in the art.

Communication from a passive or semi-passive tag 14 to a reader 12 is accomplished in the so-called backscatter way: when a passive or semi-passive tag 14 receives an interrogation signal coming from the reader 12, it reflects, or better omnidirectionally transmits back, or backscatters, the signal coming from the reader 12. An antenna load impedance control circuit of the tag 14 is used to add any desired modulation to the antenna reflections, so as to transmit preamble and payload information. A passive or semi-passive tag 14 is normally off, and is awakened by an awakening signal, or by the interrogation signal itself. The awakening signal preferably includes a UHF continuous wave that provides the energy to the tag 14.

Because of the need to obtain at least three distances 22-24, each between one tag 14 and a reader 12, interrogation of the tags 14 within area 16 from several readers 12 must occur concurrently. To coordinate the access by the readers 12 to the single UWB communication channel, Time Division Multiplexing (TDM) is in principle usable, however it leads to poor performance of a real-time locating system, both because the distances from a tag 14 to several readers 12 are computed in different times, even if slightly different, and because the interrogation phase and therefore the interval between successive positions of the tag 14 increasingly lasts with increasing number of readers 12.

To overcome these drawbacks, according to an embodiment of the disclosure described in detail hereinbelow Code Division Multiple Access—Direct Sequence (CDMA-DS) is used for UWB communication within area 16. This disclosure is to be taken without loss of generality since the extension to systems using CDMA Frequency Hopping (CDMA-FH) and analogous techniques are well within the skills of the skilled in the art. Moreover, the disclosure is not limited to CDMA techniques. In another embodiment, instead of using CDMA techniques to access the communication channel, it is possible to use channel access methods such as Carrier Sense Multiple Access—Collision Avoidance (CSMA-CA), as per the standard IEEE 802.15.4. The changes to be made in this case are detailed hereinbelow or in any case are well within the skills of the skilled in the art.

CSMA-CA techniques do not use spread-spectrum techniques. Devices adopting this kind of techniques access the communication channel when they sense that no communication is occurring, ignoring possible interference with each other. In case of collisions, they wait for a random period of time and then they retransmit the information.

Devices using CSMA-CA techniques can embed their identity inside the information packet transmitted and UWB tag readers can use this identity information—once decoded—to discern the master's signal that has to be used to adjust their clock.

As detailed below, in the case of passive and semi-passive tags 14 and CDMA-DS technique, spreading codes are used as unique identifiers, each spreading code being preferably unique to an item of the real-time locating system 10, i.e. each reader 12 and each tag 14 preferably has its own spreading code.

A spreading code is a code having such properties as to allow simultaneous access to a same communication channel by uniquely identifying the transmitter, generating a spread spectrum signal, and offering the opportunity to de-spread the signal with a minimal level of mutual interference. In particular, an ideal spreading code is a sequence of bits for which the autocorrelation is maximal in the absence of shifts, and null in the presence of shifts; and the cross-correlation between different codes is always null. However, a code with these properties is merely ideal and in practice a spreading code should have properties as close as possible to the above. There are several types of spreading codes, including orthogonal codes and non-orthogonal codes, such as balanced Gold codes. Orthogonal codes require the readers 12 to be synchronized with the tags 14, while using non-orthogonal codes only the readers 12 need to be synchronous with each other; on the other hand, the bit length being equal, the available unique non-orthogonal codes are less in number than unique orthogonal codes, and therefore only allow for a smaller locating system 10. Preferably, according to the disclosure non-orthogonal codes are used.

The reason why in the case of passive and semi-passive tags 14, the readers 12 have to be synchronous with each other is to ensure that the tags 14 backscatter the interrogation signals in phase with each other, so that each bit of the readers' spreading code is backscattered with the antenna load of the tag 14 set according to the corresponding bit of the tag's spreading code, as will be better understood hereinbelow.

With active tags 14, the times at which the "ping" frames sent by the tags 14 are received by the readers 12 must be measured, and if the readers have misaligned clocks, an error in the estimation of the location of the tags 14 occurs. This leads to performance degradation of the locating system 10.

Thus, synchronization among the readers 12 is critical in any case, (apart from TDMA systems, that have less stringent synchronization constraints but a reduced channel capacity, leading to a lower update rate) and how it is obtained according to the disclosure will be thoroughly dealt with later. First, operation of the real-time locating system 10 for locating the tags 14, once synchronization is achieved, is described.

With reference to FIG. 2, at each interrogation cycle of the tags 14 within area 16, each reader 12 transmits a packet of preferably Ns=256 information bits 30, 31, including preferably 128 preamble bits 30 and preferably 128 payload bits 31. Each information bit 30, 31 is modulated with the spreading code unique to the reader 12, to form preferably Nc=1024 chips 32, wherein Nc is the length of the spreading codes. For example, an exclusive OR or XOR operation between the i-th information bit 30, 31 and the k-th bit of the spreading code is used, so that if the i-th information bit 30, 31 is a zero, each k-th chip 32 corresponding to such i-th information bit 30, 31 is either a zero or a one (or vice versa) according to the k-th bit of the spreading code, while if the i-th information bit 30, 31 is a one, each k-th chip 32 corresponding to such i-th information bit 30, 31 is either a one or a zero (or vice versa) according to the inverse of the k-th bit of the spreading code.

Each of the Nc=1024 chips 32 is transmitted through preferably Np=8 pulses 34, which for example are positive if the chip 32 is a zero and negative if the chip 32 is a one (or vice versa). The reason why each chip 32 is transmitted through several pulses 34 is that each UWB pulse 34, due to its low amplitude and very short duration, contains too little energy for the chip to be safely detected. Transmitting several identical pulses 34 for a single chip 32 allows energy to be accumulated at the receiving side, and thus the chip 32 to be detected. Such pulse-based transmission is known as Impulse Radio (IR) and it is well known to a skilled in the art. This is independent from the CDMA technique described above, which refers to a way of encoding information and which is therefore distinct from how it is actually transmitted.

Pulses 34 are transmitted with a Pulse Repetition Period of preferably Tp=128 nanoseconds, i.e. they are separated in time by Tp=128 nanoseconds. The duration of said period Tp depends on the dimension of the area 16 that has to be covered. In particular, it has to be sufficiently large to allow each of the transmitted pulses to travel to the furthest possible tagged object 14 and back to the reader 12 that sent it before the next pulse is transmitted, i.e. without overlapping with preceding and subsequent pulses.

Thus, at each tag interrogation cycle, the reader 12 transmits its spreading code Ns=256 times, at each information bit 30, 31—also referred to as a symbol S hereinbelow-, each time through Nc*Np=1024*8=8192 UWB pulses with the values indicated above.

The transmission of each chip 32 takes a time given by Tc=Tp*Np, that is about 1 microsecond with the values indicated above.

The transmission of each information bit 30, 31 or symbol S, namely the transmission of the reader's spreading code, takes a time given by Ts=Tp*Np*Nc, that is about 1 millisecond with the values indicated above.

The transmission of the interrogation packet of Ns=256 information bits takes a time given by Ns*Ts=Ns*Tp*Np*Nc, that is about 256 milliseconds with the values indicated above.

Preferably, at least during normal operation after an initial set up and synchronization phase, the interrogation cycle is longer than the transmission time of an interrogation packet: interrogation packets are periodically transmitted with a period preferably Ti=1 sec, i.e. in the remaining about ¾ of a second, no transmission takes place and the tags 14 remain off, with the internal battery—in the case of semi-passive tags—deactivated and thus without any power consumption. This allows good performance both in terms of the conflicting requirements of locating precision and of power consumption.

In a preferred embodiment, each reader 12 always transmits an interrogation packet of Ns zeroes that may be regarded—just for reasons that will be clear hereinafter, when an information packet from the tags 14 will be described—as an interrogation instruction in a preamble and a blank payload. In this embodiment no payload information is therefore exchanged among the readers 12 through the UWB pulses, and the readers 12 communicate information with each other and/or with the CPU 18 through LAN or WLAN 20.

Instead of being comprised of zeroes, the interrogation packet transmitted by the reader 12 may be comprised of ones, or also of any other pattern that is known within system 10 or at least to the readers 12. In other embodiments, payload information bits can be communicated within area 16, in addition or alternatively to communication over the network 20. Also, different preambles may be communicated, that encode different delivery information, instructions to the readers etc. The changes to be made in these cases are fully within the skills of a skilled in the art upon reading the present disclosure. In another embodiment, e.g., a system using CSMA-CA or a similar technique, as per the standard IEEE 802.15.4, a reader 12 may embed its own unique identifier somewhere inside the information packet of the first line of FIG. 2, preferably in the payload thereof. Said identity information can be used by "slave" readers to synchronize to their "master" reader's clock as detailed below.

The packets to be transmitted are stored at least temporarily in a memory of the reader 12 or generated run-time.

In terms of the block diagram of FIG. 3, that represents an embodiment of the operation of a reader 12 in one interrogation cycle, in block 201 four pointers are initialized to 1: a reader packet pointer i, a reader spreading code pointer k, a reader pulse pointer j, and a reader time slot pointer t; moreover a few accumulators Acc1, Acc2, . . . AccZ and AccM described below are emptied. Pointer t can be initialized to the expected time slot e instead, or to another suitable value.

In block 202, the reader 12 transmits the j-th pulse 34 of the i-th packet bit 30, 31, modulated with the k-th bit 32 of its own spreading code, i.e. the k-th chip 32. Block 203 relates to the receiving operation by the reader 12 and will be described later.

In block 204 it is checked whether the pulse pointer j has reached the number Np of pulses 34 to be transmitted for each chip 32, and in the negative case the pulse pointer j is incremented by 1 in block 205 and block 202 is returned to.

When the pulse pointer j is equal to its maximum Np in block 204, it is reset to zero in a block 206 —so as to restart running from 1 after passing block 205-. A few blocks 207-212 that relate to the receiving operation by the reader 12 and will be later described are then performed onto the Np received pulses 34 of the current k-th chip 32.

Then, in block 213 it is checked whether the spreading code pointer k has reached the number Nc of chips to be transmitted for each packet bit 30, 31, and in the negative case the spreading code pointer k is incremented by 1 in block 214 and block 205 and then block 202 are returned to.

When the spreading code pointer k is equal to its maximum Nc in block 213, the spreading code pointer k is reset to zero in a block 215 —so as to restart running from 1 after passing block 214-. A few blocks 216-222 relating to the receiving and synchronization operation by the reader 12 and later described are performed onto the Nc received chips 32 of the current i-th information bit 30, 31.

Then in block 223 it is checked whether the packet pointer i has reached the number Ns of information bits 30, 31 to be transmitted for each packet, and in the negative case the packet pointer i is incremented by 1 in block 224 and, after a few blocks 225-226 relating to the receiving and synchronization operation by the reader 12 and later described, blocks 214, 205 and then block 202 are returned to. In the positive case, the interrogation cycle is over after an optional block 227 described below.

Thus, the various blocks and pointers i, j, k embody nested cycles whereby for every one of the Ns packet bits 30, 31, and for every one of the Nc chips 32, the Np UWB pulses 34 are transmitted in block 202.

When a passive or semi-passive tag 14 receives the UWB pulse sequence forming the interrogation packet thus sent by reader 12, possibly having been awakened by a continuous UHF wave, it backscatters the pulses with an antenna load that is set (as very schematically indicated in the last line of FIG. 4) according to an information packet of Ns bits 36, 37, in turn modulated according to a tag spreading code of Nc bits, to form Nc chips 38, as shown in FIG. 4. Preferably in the information packet, a preamble is formed of zeroes or of ones, or of a pattern known within system 10 or at least by the readers 12, and a payload is formed of a tag ID, preferably coded according to the Electronic Product Code (EPC) standard. This allows to use standard tags 14, that are able to be located both in a real-time locating system 10 according to the disclosure, and in other types of locating systems, such as conventional RFID systems.

The information packet 36, 37, or separately the tag ID and the tag's spreading code, are stored in a memory of the tag 14.

In another embodiment, the tag ID is not transmitted, the tag 14 being identified within system 10 based on its spreading code. In this case, also the information packet transmitted by the tags is preferably formed of zeroes and any distinction between preamble and payload is meaningless.

With reference to FIG. 5, that represents an embodiment of the operation of a tag 14 in one interrogation cycle, in a block 301, a tag packet pointer m and a tag spreading code pointer n are initialized to 1. In block 302, the tag 14 sets the antenna load to one of two values corresponding to the m-th bit of the information packet modulated by the n-th bit of its own spreading code. For example, an exclusive OR or XOR operation can be used for the modulation.

In block 303 it is checked whether the tag spreading code pointer n has reached the number Nc of chips to be transmitted for each packet bit 36, 37, and in the negative case the tag spreading code pointer n is incremented by 1 in block 304 and block 302 is returned to.

When the tag spreading code pointer n is equal to its maximum Nc in block 303, it is reset to zero in a block 305 —so as to restart running from 1 after passing block 304-. Then in block 306 it is checked whether the tag packet pointer m has reached the number Ns of information bits to be transmitted for each packet, and in the negative case the tag packet pointer m is incremented by 1 in block 307 and block 304 and then block 302 are returned to. In the positive case, the interrogation cycle is over.

Thus, the various blocks and pointers m, n embody nested cycles whereby for every one of the Ns packet bits 36, 37 including the tag ID, and for every one of the Nc chips encoding the tag spreading code, the Np UWB pulses 34 received from a reader 12 are backscattered in block 302, either changed or unchanged in sign according to the antenna load as set based on the result of the modulation, preferably based on the m-th packet bit XOR the n-th tag spreading code bit. Alternatively to a change in sign, a change in amplitude can occur.

It will be understood that, to maintain the parallelism between operation of the readers 12 and tags 14, the bit of the spreading code or chip according to which the antenna load is set is changed every Np*Tp time units (about 1 microsecond with the values indicated above); the bit of the information packet according to which the antenna load is set is changed every Nc*Np*Tp time units (about 1 millisecond with the values indicated above).

It should be noted that a tag 14 will receive several "interleaved" pulse sequences, each from one of the several readers 12—and possibly even more than one from each reader, considering that there may be multiple paths from a reader 12 to a tag 14. If the readers 12 are synchronous with each other, the Np pulses 34 corresponding to the k-th chip 32 and the i-th information bit 30, 31 will be issued simultaneously from the readers 12, and will generally reach the tag 14 in different instants according to the different reader to tag distance 22-24. By the timing of antenna load setting outlined above, all UWB pulses corresponding to the k-th chip 32 and the i-th information bit 30, 31 issued simultaneously from the readers 12 will be backscattered by the tag 14 with a same antenna load, corresponding to the n-th chip of the m-th packet bit, wherein k=n and i=m. Thus, the interrogation signals from the readers 12 are backscattered in phase with each other. This holds true for maximum distances—of the shortest path in case of multiple paths—given by c*Tp, wherein c is the speed of light in the medium of area 16, i.e. about 40 meters with the values indicated above. Considering the way back from tag 14 to reader 12, the maximum distances allowed in the system will be half that value, i.e. about 20 meters with the values indicated above.

When a reader 12 receives a sequence of UWB pulses, it is capable of recognizing whether it is the sequence issued by itself and backscattered by a tag 14, or reflected by an obstacle, and in this case also by which tag 14, and the distance the tag 14 or the obstacle is from itself.

To this end, turning back to FIG. 3, in block 203 the reader 12 accumulates the energy of the Np UWB pulses it receives spaced from each other by period Tp, i.e. having a predetermined pulse period Tp, for the k-th symbol of an (allegedly) received spreading code. More specifically, reader 12 preferably has a rake-like receiver comprising a number Nf of fingers, wherein each finger can be tuned to receive and accumulate the energy received within one single time slot, having a duration Tf comparable to that of a single UWB pulse 34. The Pulse Period Tp is divided into a number Nt of time slots 35 (indicated on FIG. 2), wherein Nt is given by Tp/Tf. The duration Tf of a time slot 35 depends on the desired spatial resolution that the RTLS system 10 has to achieve. A greater Tf leads to a lower spatial resolution since it divides the Pulse Repetition Period Tp into a smaller number of time slots. Preferably Nt is an integer multiple of Nf. For example, if a single UWB pulse 34 has a duration of 1 nanosecond, Tf is 1 nanosecond, and Tp is 128 nanoseconds, the pulse repetition period Tp is divided into Nt=128 time slots, as shown in FIG. 2.

As seen, at each repetition of block 203, the reader 12 accumulates the energy contained in each of Nf time slots for the k-th symbol of an (allegedly) received spreading code, by summing the energy of all Np pulses 34 received in each of said time slots in each of Nf accumulators Acc1, ... AccNf, so as to increase the energy value by maintaining the information unchanged since all Np pulses have the same sign. By way of an example, FIG. 6 diagrammatically shows the energy accumulated in the first Nf=4 contiguous time slots 35. Referring to a time slot pointer t, it is possible to change the Nf monitored time slots after a suitable monitoring period, as shown in FIG. 7 and FIG. 8, wherein the time slots numbered 1+Nr(t−1), 2+Nr(t−1), Nf+Nr(t−1) (also expressed as [(t−1)*Nf+1, (t−1)*Nf+Nf] with t=1,_, Nt/Nf). are monitored each, time. The fingers need not monitor contiguous time slots as shown in FIGS. 6-8: in another embodiment, for example, the monitored time slots could be those numbered 1, 33, 65, 96 ... then 2, 34, 66, 97 ... etc. t, t+Nt/Nf, t+2(Nt/Nf), ....

The suitable monitoring period after which the time slot pointer t is changed is, during the tag interrogation phase, the packet transmission time, because all the preamble and payload symbols 30, 31 must have been received to recognize the ID of a tag 14, transmitted as payload. Thus, the time slot pointer t may only be changed, during the tag interrogation phase, after a time given by Tp*Np*Nc*Ns, about 256 milliseconds with the values indicated above. In another embodiment, the suitable monitoring period after which the time slot pointer t is changed depends on the part of information packet that the reader 12 is transmitting. In particular, during the transmission of the preamble the time slot pointer t is changed every information bit 30, 31 has been sent, as to determine the presence of the pulses backscattered by the tag 14 and its distance from the reader 12, since the preamble does not contain relevant data. In a later stage, during the transmission of the payload, each finger is kept fixed at a given time slot (determined during the previous phase as containing a pulse backscattered by tag 14) in order to receive all payload bits and to be capable of decoding the identity of the tag.

As better discussed below, in a synchronization step, the suitable monitoring period after which the time slot pointer t is changed can be shorter and only correspond to the reception of all chips 32 of one single information bit 30, 31 of each packet, because this information bit 30, 31 encodes the spreading code of the reader 12, as to ensure that a slave reader 12 has successfully determined the identity of the sender of the UWB pulses before it decides whether the synchronization signal has been detected or not. Thus, the time slot pointer t may be changed, during the synchronization phase, after a time given by Tp*Np*Nc, about 1 millisecond with the values indicated above. In another embodiment where the system 10 uses CSMA-CA techniques, the time slot pointer t may be changed, during the synchronization phase, after a minimum time that depends on the length of a unique identifier of the readers 12.

Accordingly, the time slot pointer t is initialized to 1 in block 201 of FIG. 3, and, if block 225 determines that t has to be updated, it is incremented by 1—or returned to 1 after having been 128/Nf—in block 226.

Once the Np pulses received at each of Nf time slots have been accumulated in Acc1, ... AccNf in step 203, i.e. after pointer j had reached Np as checked in block 204—and has been reset to zero in block 206-, the accumulated energy is processed in a plurality of parallel branches after block 206. Of these, the blocks 207 and 208 of one branch relate to the synchronization and will be described later on.

If Z is the number of tags 14 possibly present within area 16 (Z is the number of the spreading codes with a given length, that can be allocated to tags) and Nf is the number of receiver fingers as said above, in a number of blocks 209, ... 210 of the parallel branches, the energy accumulated in each of Acc1, AccNf is multiplied by +1 or −1 (or vice versa) based on the k-th bit of the spreading code of each of the Z tags 14, and based on the k-th bit of the spreading code of the reader 12 under consideration. More specifically, in block 209 the accumulated energy is multiplied by +1 or −1 based on the k-th bit of (reader's own spreading code XOR spreading code of tag1), ... and in block 210 the accumulated energy is multiplied by +1 or −1 based on the k-th bit of (reader's own spreading code XOR spreading code of tagZ).

The Z spreading codes of the Z tags 14 are suitably stored in a memory of reader 12.

The so multiplied energy is accumulated in a respective accumulator Acc1-1, ... AccNf-1; Acc1-Z, ... AccNf-Z in blocks 211, ..., 212 of the parallel branches.

Once the Nf time slots have been monitored by the receiver fingers for the duration Tp*Np*Nc of one information bit 30, 31, namely for about 1 millisecond with the values indicated above, i.e. after k had reached Nc as checked in block 213—and has been reset to zero in block 215-, the energy accumulated in the Z*Nf accumulators Acc1-1, ... AccNf-1; Acc1-Z, ... AccNf-Z is evaluated in a few blocks of parallel branches, that in turn are parallel to a branch comprising blocks 216-218 that relate to the synchronization and will be described hereinbelow.

In a number of blocks 219, ... 220 of the parallel branches, it is checked whether the energy accumulated in a respective one of the accumulators Acc1-1, ... AccNf-1; Acc1-Z, ... AccNf-Z is greater than a suitable threshold and thus the information contains a symbol, or not, as better discussed below.

If the accumulated energy is greater than the threshold, the detected symbol is used to compute the distance 22-24 or ranging of the corresponding tag 14 from the reader 12 under consideration, and/or possibly stored for further processing in blocks 221, ... 222 of the parallel branches.

Once the Nf time slots have been monitored by the receiver fingers for the duration Tp*Np*Nc*Ns of one interrogation packet of bits 30, 31, namely for about 256 milliseconds with the values indicated above, i.e. after i had reached Ns as checked in block 223, the detected symbols stored in the various executions of blocks 221, ... 222 are processed, e.g. the ID of a tag 14 is read from the stored symbols, and the distance of said tag from the reader under consideration is computed.

A symbol will be successfully detected, in one of the blocks 219, ... 220, if the pulses received during the duration Tp*Np*Nc of one bit 30, 31 are the pulses sent by the reader 12 under consideration and backscattered by the tag 14 which spreading code has been used in the block 209, ... 210 of the corresponding branch. A tag ID will be successfully read from the Ns symbols detected at said branch, if the readers 12 are synchronous also at the packet level.

Consider indeed a perfectly synchronized system. For each chip i.e. for each value of k, if the Np pulses received in one time slot (by one finger) correspond to the pulses that the reader under examination had transmitted as a preamble bit 30 at zero, they will all be equal and be either positive or negative according to the k-th bit of the reader's spreading code. Just by way of a simple example, let a Reader1 spreading code be 1011: using a specific bipolar encoding as an example, this reader will transmit Np negative pulses for the first one, Np positive pulses for the zero, and Np plus Np negative pulses for the last ones. Using a "+" or "−" symbol for Np pulses, the transmitted sequence will be "−+−−".

Let a Tag1 spreading code be 0011 so that reader spreading code XOR Tag1 spreading code is 1000. Tag1 will backscatter the pulses with an antenna load such as not to invert the first Np plus Np pulses, and to invert the last Np plus Np pulses (or vice versa). Thus, the backscattered sequence will be "−+++" (see the result of the above XOR).

In the four executions of block 209, . . . 210 of the branch where the spreading code of Tag1 is used, since the same result of the above XOR is used, the pulse sequence will be transformed into "++++". Thus, the energy accumulated in the corresponding accumulator AccX will sum up and be at a positive maximum—neglecting attenuation for the sake of clarity-, thus being correctly interpreted as a preamble symbol or information bit 30 at zero. If the bit were a payload bit 31, then the pulse sequence would eventually be transformed into "++++" or "−−−−" according to the corresponding bit of the tag ID, and detected as a zero or one payload bit 31 accordingly.

In this case, in block 221, . . . 222 the reader 12 computes the distance the corresponding tag 14 is from itself: assuming that the reader 12 had transmitted the interrogation signal in the a-th time slot and the successfully de-spread pulse sequence is the sequence received in the b-th time slot—the time slot monitored by the receiver finger corresponding to the accumulator AccX wherein the energy is greater than the threshold-, then the tag 14 is at a distance given by (b−a)*Tf*c/2, wherein a is usually 0 and the distance is therefore given by b*Tf*c/2.

Let now a Tag2 spreading code be 0110 so that reader spreading code XOR Tag2 spreading code is 1101. Tag2 will backscatter the pulses transmitted by Reader1 with an antenna load such as not to invert the first Np pulses, to invert the intermediate Np plus Np pulses, and not to invert the last Np pulses. Thus, the backscattered sequence will be "−−+−".

In the four executions of block 209, . . . 210 of the branch where the spreading code of Tag2 is used, the pulse sequence will be transformed into "++++", while in the four executions of block 209, . . . 210 of the branch where the spreading code of Tag1 is used, the pulse sequence will be transformed into "+−+−". Thus, the energy accumulated in the corresponding accumulator AccX will not be at a maximum, rather it will be below the threshold, and the symbol will not be successfully detected.

Let now another Reader2 spreading code be 0101: this other reader will transmit a sequence "+−+−", that will be backscattered by Tag1 as "+−−+" and by Tag2 as "++−−". Again, the energy accumulated in the corresponding accumulator AccX of Reader1 will not be at a maximum, and the symbol will not be successfully detected.

As another possible cause of failure to demodulate or de-spread, the sequence of UWB pulses 34 received by the reader under examination could be the interrogation signal from the same reader 12, but backscattered by a tag 14 that had been awakened by another reader 12 so asynchronous with the reader under examination, that the tag is using bits of its spreading code not corresponding in place with the bits of the spreading code of the reader under examination, namely pointer k and pointer n at the two items do not correspond in value. For example, if Reader2 leads Reader1 by one or more chips, then Tag1 will be awakened by Reader2 and the pulse sequence later transmitted by Reader1 will be backscattered with improper antenna loads (k<>n). It can be easily verified that as a result the energy accumulated in accumulator AccX of Reader1 corresponding to Tag1 will not be above the threshold and a symbol will not be detected in blocks 219-222.

As still another possible cause of failure to demodulate or de-spread, the sequence of UWB pulses 34 received by the reader under examination could be the interrogation signal from the same reader 12, backscattered by a tag 14 slightly asynchronous with it, so that the tag switches the bits of its spreading code and thus the antenna load during the duration of one chip transmitted by the reader, namely pointer k and pointer n at the two items correspond in value only for a part of period Tp. For example, if Reader2 leads Reader1 by half of a chip period, then Tag1 will be awakened by Reader2 and the pulse sequence later transmitted by Reader1 will be back-scattered with proper antenna loads (k=n) for the first half of each group of Np pulses, and with improper antenna loads (n=k+1) for the second half of each group of Np pulses. It can be easily verified that as a result the energy accumulated in accumulator AccX at Reader1 corresponding to Tag1 will not be above the threshold and a symbol will not be detected in blocks 219-222, or will suffer more strongly from system noise.

In this regard, the fact that a plurality of pulses 34 is transmitted for each chip 32 can be exploited to increase the probability of successfully detecting a symbol (and thus successfully detecting and locating a tag 14) by suitably selecting the threshold value used in blocks 221, . . . 222, so that a preselected fraction of correctly received pulses are enough, e.g. Np/2+1 correctly received pulses (at least 5 pulses out of the 8 sent pulses with the preferred values indicated above). In this way, the locating system 10 may be made tolerant to a slight asynchronism.

As will be understood, if obstacle localization is desired, a further branch may be used, in parallel with 209-212 and in parallel with 219-222, wherein the accumulated energy is multiplied by +1 or −1 based on the k-th bit of the spreading code of the reader 12 under consideration.

As said above, in order for the real-time locating system 10 to have good performance, it is critical that the readers 12 are synchronized with each other, so that they start interrogating the tags, i.e. start the transmission of each interrogation packet of bits 30, 31, simultaneously or at least that they start transmission of each bit simultaneously when preamble and payload information is not critical and merely the tag's spreading code is used to locate the tag. More specifically, as said above in the case of passive and semi-passive tags 14, the readers 12 have to be so synchronous with each other as to ensure that the tags 14 backscatter the interrogation signals from the various readers 12 in phase with each other, so that each k-th chip of the readers' spreading code is backscattered with the antenna load of the tag 14 set according to the corresponding n-th chip of the tag spreading code, i.e. with n=k. Thus, it is necessary to guarantee that transmission of each interrogation packet of bits 30, 31 or at least of each bit 30, 31 from each reader 12 starts with a mutual delay that is not greater than the time it takes to transmit a sufficient number of pulses 34 of one chip 32: the mutual delay should be less than Tp*Np, i.e. less than about 1 microsecond with the values indicated above.

A synchronization within a comparable order of magnitude, of less than about 1 microsecond, is also looked for in case of active tags 14, to ensure that the measured times at which the "ping" frames autonomously sent by the tags 14 are received by the various readers 12 do not lead to inacceptable location estimation errors.

According to the disclosure, the required synchronization among the readers 12 of the real-time locating system 10 is performed by exploiting the UWB communication itself, namely even without requiring any additional hardware resources. Merely, a UWB transmitter is to be added to one or more readers of the system if they were configured for working only with active tags and thus lacked a UWB transmitter.

The flowchart of FIG. 9 is a high-level flowchart of an embodiment of a synchronization method according to the disclosure for a real-time UWB locating system 10. In a configuration step 410, each of the readers 12 of the system 10 receives instructions about its role and about at least part of the geometrical configuration of the real-time locating system 10.

More specifically, in step 410 each reader is told its role selected from (i) master reader and (ii) slave reader and, in a preferred embodiment, also (iii) clock relay reader. A slave reader is a reader that adjusts its own local clock in order to synchronize it with the clock of an elected reader, called master reader herein. A clock relay reader is a reader acting both as a slave with respect to its master, and as a master with respect to other slave or clock relay reader(s). For this reason, any reference to a slave reader hereinbelow should be understood as a reference to a slave reader and/or a clock relay reader in its capacity of being a slave reader, unless otherwise specified. Similarly, any reference to a master reader hereinbelow should be understood as a reference to a master reader and/or a clock relay reader in its capacity of being a master reader, unless otherwise specified.

When there is only one master reader, all slave readers directly synchronize their clocks with the clock of the single master reader. When having only one first master reader is not possible or not desired—because as will be better understood below, a slave reader should be preferably in line of sight (LOS) with its master reader—then one or more slave readers having the first master reader in LOS act in turn as masters for one or more other reader(s) not having the first master reader in LOS, i.e. act as clock relay readers. This allows a tree topology or a daisy-chain topology of the UWB locating system 10.

In configuration step 410, each slave reader and each clock relay reader is provided with its master's spreading code and with a value indicative of the distance the master reader is from it, as better specified hereinbelow. If desired, the master's ID may also be provided. This information is stored in a suitable memory of the reader 12 concerned. In another embodiment that does not use CDMA but that relies on CSMA-CA techniques instead, in the configuration step 410 the slave reader is provided with the unique identifier of master reader.

It is noted that all readers 12 of system 10 are preferably equipped with all hardware and software modules adapted to perform each role, the modules being either activated or not in the configuration step 410.

Merely by way of an example, FIG. 10 shows an exemplary real-time UWB locating system 10 wherein reader 121 acts as master reader, readers 122 and 123 act as slave readers, their own master being reader 121; reader 124 acts as a clock relay reader, i.e. is a slave reader with its own master being reader 121, and is in turn a master reader; readers 125, 126, 127, that are not in LOS with reader 121 because of walls 163, 164 and of the presence of reader 124, act as slave readers, their own master being clock relay reader 124. Readers 121-124 may be said to be in or to form a first cell 161, and readers 124-127 may be said to be in or to form a second cell 162.

In the configuration step 410 of FIG. 9, slave reader 122 is provided with the spreading code of master reader 121 and their mutual distance suitably expressed; clock relay reader 124 is provided with the spreading code of master reader 121 and their mutual distance; slave reader 125 is provided with the spreading code of clock relay reader 124 and their mutual distance etc.

In optional step 420, a coarse synchronization of the readers 12 of the locating system 10 may take place. This may occur through software-based synchronization protocols, such as the IEEE 1588 Precision Time Protocol (PTP) or the Network Time Protocol (NTP). These communication protocols cannot guarantee the clock accuracy desired in the real-time locating system 10 (less than about 1 microsecond as detailed above), because they require traversing the software stack, which inherently introduces non-deterministic delays. However, they can be profitably used to obtain a coarse synchronization, e.g. a maximum clock offset among readers 12 of about ±100 microseconds without hardware timestamp, that would require dedicated hardware with ensuing costs. These protocols may run over the LAN or WLAN 20 of system 10.

The coarse synchronization in step 420 advantageously provides synchronization at an information packet level, i.e. it avoids offsets larger than one information bit 30, 31. Thus after coarse synchronization 420, the i-th bit of the packets transmitted by all readers 12 overlap in time at least in part. The coarse synchronization in step 420 may also occur through a hardware-based solution, i.e. laying a cable that is used to distribute a synchronization signal to all readers: in order to obtain fine synchronization to the desired clock accuracy of less than about 1 microsecond, the cables should be of exactly the same length to avoid different propagation delays, unless a delay compensation mechanism is used; however this constraint can be relaxed—and the related costs for deployment and maintenance can be substantially lowered—by only looking for a coarse synchronization, as requested by step 420.

Moreover, in case the real-time locating system 10 is outdoors, the Global Positioning System (GPS), with its accurate GPS time obtained as a side product of self-locating, may be used to obtain coarse synchronization.

A comparison of the performance of the system 10 of the disclosure when the coarse synchronization step 420 is performed and when it is not will be provided later.

After the optional coarse synchronization of the readers 12 in step 420, a step 430 of fine synchronization according to the disclosure takes place, which will be thoroughly described below.

Fine synchronization in step 430 is preferably cyclically performed throughout the life of locating system 10, so as to maintain the synchronization of readers 12 within the required clock accuracy during normal operation of the system 10.

Preferably, however, the fine synchronization 430 is performed at a different cycle period according to whether it is the initial synchronization at system set up, or the maintenance of synchronism during the system normal operation. Accordingly, after the initial fine synchronization or first execution of step 430 and before repeating it, a synchronization period is adjusted in optional step 431, e.g. being changed from about 1 millisecond (or 256 milliseconds if synchronization is desired at an information packet level and coarse synchronization step 420 is not performed) for CDMA systems as will be understood below, to 1 second. Moreover, in another embodiment where the system 10 uses CSMA-CA techniques, the synchronization can be repeated with a minimum period that depends on the length of the master's unique identifier, as to ensure that a slave reader has successfully determined the identity of the sender of the UWB pulses before it decides whether to synchronize to its clock or not. In this step 431, the period after which the time slot pointer t is changed can also be set. This period is referred to by block 225 of FIG. 3.

Also, after the initial fine synchronization or first execution of step 430 and before repeating it, an optional step 432 of activating the tags 14 can be performed if the first execution of step 430 is performed with the tags 14 off. Activation of the tags 14 may be performed by emitting a continuous UHF wave within area 16, e.g. by one or more readers 12, or by CPU 18, or by a dedicated UHF emitting device.

In fine synchronization step 430, a slave reader—including a clock relay reader—has to adjusts its own local clock in order to synchronize it with the clock of the or its master reader. According to the disclosure, this is advantageously performed by exploiting the transmission of UWB pulses by the master reader, and even more preferably those UWB pulses that are transmitted as interrogation signal for the tags 14 as described above. A slave reader will indeed receive the UWB pulses transmitted by the remaining readers in the area 16 or in the cell 161, 162 it is part of, and therefore also the UWB pulses transmitted by its master reader. With operations that will be detailed below with reference to FIG. 3, that resemble the operations made to detect the tags, the slave reader 12 is able to ascertain whether a received sequence of pulses is that transmitted by its master reader, based on the master spreading code.

However, from the distance information obtained in the configuration step 410, the slave reader 12 has the knowledge of the temporal slot in which it expects to receive UWB pulses transmitted by its master reader, under the assumption of perfect synchronism with its master reader. As will be understood, the expected time slot e-th is related to the master-slave distance by the speed of propagation of the UWB pulses in the prevailing medium of area 16, according to the following formula: e=D/(c*Tf) wherein D is the master to slave distance and the remaining symbols have the meaning stated above.

Thus, in configuration step 410 the master-slave distance information may be provided to the slave reader in a length unit of measure as distance D in the above formula, in a time unit of measure as D/c in the above formula, or directly as a dimensionless number e indicative of the expected e-th temporal slot.

Stated in general, according to the disclosure the slave reader will therefore monitor the expected e-th temporal slot with a receiver finger, and decide that the readers are synchronous if the pulse sequence transmitted by its master reader is actually received in the expected time slot e and successfully decoded; otherwise it will adjust its own local clock in order to synchronize it with the clock of its master reader, until the pulse sequence transmitted by its master reader is actually received in the expected e-th temporal slot. In another embodiment, a slave reader 12 decides that synchronization has been achieved if the pulse sequence transmitted by its master is actually received in the expected time slot and if it forms an information (or a part of it) that contains the master's unique identifier in the information packet.

With reference to FIG. 11, in part (a) a sequence of period Tp of UWB pulses 34 issued by a master reader in the first time slot (t=1) is shown without loss of generality. Transmission might occur in a different time slot, the changes to be made being well within the skills of a skilled in the art. In view of the master-slave distance D, the pulses 34 are expected at the slave reader in the expected e-th time slot 130. Item 131 indicates the propagation time D/c from the master reader to the slave reader, in turn related to the master-slave distance D.

In part (b), perfect synchronism between the slave reader and the master reader is assumed, and the pulses 34 are actually received when the expected e-th time slot 130 is monitored. The pulse sequence can also be correctly de-spread as detailed below.

In part (c), the slave reader and the master reader are assumed to be asynchronous, the slave's clock having an arbitrary offset 132 with respect to the master's clock: in this case, the pulses 34 are not received when the expected e-th time slot 130 is monitored.

In part (d), the slave reader and the master reader are assumed again to be asynchronous, but the slave's clock having such an offset 132 with respect to the master's clock corresponding to one pulse repetition period Tp (as shown) or to an integer multiple of the pulse repetition period Tp: in this case, the UWB pulses 34 are received when the expected e-th time slot 130 is monitored. However, the pulse sequence cannot be correctly de-spread, because the first pulse is actually missed and the other pulses are staggered by one with respect to the master spreading code as used for the de-spreading attempt. Such an asynchronism can be taken into account by suitably selecting a threshold that allows to consider the de-spreading attempt successful when only part of the transmitted Np pulses are received in the expected time slot. If however the offset 132 is so large, compared with the chip period, that the Np pulses (or the majority thereof) are received in the expected time slot of the incorrect chip, then the de-spreading attempt will not succeed. In another embodiment that uses CSMA-CA, no de-spread operation is required because the information bits are not spreaded during the transmission. Nevertheless, the majority of pulses has to be correctly received in the expected time slot, as will be fully understood by a skilled in the art.

Turning back to FIG. 3, the blocks that embody the fine synchronization step 430 as performed by a slave reader will now be described.

If the Np pulses received at the expected e-th time slot have been accumulated in step 203 in one of Acc1, . . . AccNf, then the energy accumulated in such accumulator is multiplied by +1 or −1 based on the k-th bit of the master spreading code in block 207.

The so multiplied energy is accumulated in a respective accumulator AccM in block 208.

Once the expected e-th time slot has been monitored by a receiver finger for the duration Tp*Np*Nc of one information bit 30, 31, the energy accumulated in the accumulator AccM is evaluated in block 216.

In block 216 it is checked whether the energy accumulated in accumulator AccM is greater than a suitable threshold and thus the information contains a symbol, more specifically a transmitted zero, or not. In another embodiment using CSMA-CA, the decision taken in 216 can be taken only after the slave reader has received a certain number of information bits from its master reader. This number is the number of bits that have to be analyzed before a slave reader can discern the identity of the sender of the pulses and it depends on the length of its master's unique identifier and on the position of said identifier in the information packet of FIG. 2. The changes that have to be applied to the flowchart in FIG. 3B for said embodiment are well within the skills of a skilled in the art.

If the accumulated energy is greater than the threshold, this means that the slave reader under consideration is synchronous with its master, so that in block 218 a Master Pulse Detected signal is activated (a flag is set to true) and the fine synchronization step 430 is ended.

Consider indeed perfectly synchronized readers. For each chip i.e. for each value of k, if the Np pulses received in the expected time slot correspond to the pulses that the master reader had transmitted as a preamble or payload bit 30 at zero, they will all be equal and be either positive or negative according to the k-th bit of the master reader's spreading code. Considering again the above simple example, let Reader2 be the master reader. As seen, this Reader2 having spreading code 0101 will transmit a sequence "+−+−", that will be directly received by slave Reader1.

In the four executions of block 207, the pulse sequence will be transformed into "++++". Thus, the energy accumulated in the corresponding accumulator AccM will be at a maximum (or at least above the threshold) and the transmitted zero may be detected.

If conversely in block 216 the energy accumulated in accumulator AccM is smaller than the threshold, so that the attempt to demodulate is unsuccessful and the information bit 30, 31 does not read as a zero (or in another embodiment, if the reader is not capable of reading the master's unique identifier), then in block 217 a local clock is adjusted in an attempt to reach synchronism with the clock of the master reader during processing of the next symbol 30, 31 of the same packet or of the first symbol of the next packet, as the case may be according to the value of pointer i as checked in block 223 and as increased in block 224. The Master Pulse Detected signal may be deactivated (flag may be set to false) in block 217.

Again as an alternative, all pulses received during the duration Tp*Np*Nc of one information bit 30, 31 or even all pulses received during the duration Tp*Np*Nc*Ns of one interrogation packet of bits 30, 31 may be stored and later processed, in parallel or sequentially, with the master spreading code as described.

More precisely, in block 217 a delay PrecLev preferably equal to the duration Tf of one time slot is added to the local clock: by thus delaying all the time slots and in particular the expected e-th time slot, another attempt can be made to look for the sequence of UWB pulses 34 from the master reader in the expected e-th time slot in the next execution of the described blocks.

It is to be noted that in case a rake-like receiver having Nf fingers is used, the master signal may be looked for also in the time slots different from the expected e-th time slot, monitored by the other fingers, by blocks totally analogous to blocks 207 and 208. In case the master signal is found in the f-th time slot instead of in the e-th time slot, the synchronism can be reached by setting the delay to f-e or e-f, as the case may be.

If the fine synchronization step 430 is not performed concurrently with the reading of the tags 14, such as during setup of the system 10, the finger(s) are preferably kept still so as to constantly monitor the expected e-th time slot and possibly the time slots adjacent thereto. If conversely the fine synchronization step 430 is performed concurrently with the reading of the tags 14, such as during the normal operation of the system in order to maintain the synchronism, then the steps of blocks 207-208 and 216-218 will only be performed when there is one finger set at the expected e-th time slot.

According to another embodiment, at least one of the fingers of the rake-like receiver will be constantly kept fixed at the expected e-th time slot and possibly those adjacent thereto, while the remaining Nf-1 fingers (or Nf-3) will be shifted as above disclosed with reference to FIGS. 6-8 so as to monitor the entire pulse repetition period Tp, so as to locate the tags 14 at any distance from the reader under consideration. In the latter case, preferably the number of fingers will be one (or 3) plus an integer submultiple of the number Nt of time slots.

The behavior in block 217 may be slightly different if the reader had already been synchronized at a previous cycle—as indicated by the current value of the Master Pulse Detected signal or flag. Indeed, while at the beginning a clock offset like offset 132 has to be compensated, thereafter during normal operation the synchronism is generally lost because of a clock drift. Accordingly, the time slots adjacent to the expected e-th time slot should be preferably also be analyzed in said blocks analogous to blocks 207, 208, 216 to check whether they do contain the master pulse sequence (or in another embodiment, if they contain the master's unique identifier in the information packet), and in the affirmative the local clock may be adapted e.g. by increasing or decreasing the number of clock pulses—provided e.g. by a quartz oscillator-considered to be one time slot, so as to compensate for the clock drift.

As said, in the fine synchronization step 430, preferably the slave reader 12 synchronizes its local clock with that of its master reader using the same UWB pulse sequence that the master reader uses to interrogate the tags 14 for the purposes of locating the tags 14 in real-time, i.e. an interrogation packet of Ns zeroes. This has several advantages. It allows any reader to become a master for at least one slave reader without it even knowing it: the master has to change nothing at all in its behavior. It minimizes the burden on the readers that act as slaves, that already perform time slot monitoring, UWB pulse reception and accumulation for their task of tag reading, and can thus very easily be adapted to make the de-spreading attempt(s) using the spreading code of the master. It minimizes network load and interferences because it does not need any specific communication during the normal operation of the system. It is to be noted that this holds true also in the case of CSMA-CA.

However, other embodiments may provide for using UWB communications different from those transmitted to interrogate the tags 14. For example, a specific data packet can be transmitted by the master(s) for the purposes of synchronization, wherein the preamble and/or payload are different from all zeroes, and/or each chip can be transmitted using a specific UWB pulse sequence.

Although according to the above embodiment the readers 12 only encode the transmitted zeroes with their spreading code, they may also transmit their ID as payload.

Thus far, it has been disclosed how the readers 12 obtain synchronization at a symbol level. This allows to compute ranging for the tags 14 based on the tag's spreading codes that are encoded in each symbol 30, 31, as disclosed. If also the reading of the tag ID in block 227 of FIG. 3 is desired, then the synchronism should be obtained and maintained at a packet level. Synchronism at a packet level is preferably obtained by coarse synchronization step 420, as said. Or, once synchronism at a symbol level is obtained, the slave reader's local clock may be adjusted by shifting it one symbol period Ts at a time, until synchronism at information packet level is reached.

As an alternative to this shifting, each slave reader 12 may notify the CPU or master that it reached synchronism; once all readers 12 have so notified the CPU or master, all readers 12 can be notified by the CPU 18 or by their master reader that the fine synchronization phase 430 has been completed and that they have to start transmitting their interrogation packets at a given instant, which will be the same for all readers since they are synchronized.

The above disclosed method may be implemented in a reader 12 using a memory and a processor, such as a microprocessor or a Field Programmable Gate Array (FPGA) or discrete components.

FIG. 12 shows a block diagram of an embodiment of a reader 12. For the sake of clarity, one single finger is considered, the changes to be made in case of a rake-receiver being fully within the skills of a skilled in the art.

Module 501 embodies a PTP software or other software/hardware configured to obtain a coarse synchronization signal—such as a packet including a time stamp—from the LAN or WLAN 20 that connects all readers 12 and possibly the CPU 18, and to provide the coarse synchronization signal or timestamp 502 to a Clock Adjustment module 505.

A Clock signal generator module 503, that may include e.g. a quartz oscillator or other ad-hoc device, provides a coarse clock signal 504.

Coarse clock signal 504 comprises a continuous sequence of clock pulses or "tics" having a very high frequency—such as 1 GHz used for the timing of the digital circuits comprising the reader 12, apart from what stated below.

Coarse clock signal 504 is provided to Clock adjustment module 505 described hereinbelow, which in turn provides an Adjusted clock 506 that is disseminated to all digital components inside the reader 12. Briefly stated, Clock adjustment module 505 adapts the issue of the clock pulses by issuing the clock pulses of signal 506 more or less frequently with respect to the clock pulses of signal 504 so as to compensate for lags and leads. The adaptation is made based on coarse synchronization signal or timestamp 502 and a fine offset signal described below.

Based on the Adjusted clock 506, all the components of reader 12 are operated, and in particular components 509 and 531 identify—such as by counting each time a preset number of clock pulses—the start of a packet, the start of a symbol 30, 31 within each packet, the start of a chip 32 within each symbol 30, 31, and the start of a time slot 35 within each chip 32. More in general, the clock pulses provide the timing for UWB pulse transmission (module 531) and UWB pulse reception (module 509) regardless of the concepts on which CDMA techniques rely. Hence, the changes that have to be applied to extend said blocks to embodiments using CSMA-CA are well within the skills of a skilled in the art.

UWB receiver module or RX front-end module 507 receives UWB pulses 34 and accumulates Np subsequent pulses in register or accumulator Acc1 508. A receiver scheduler 509 controls the receiver 507 and the accumulator 508 and controls accumulators 508, 516-518 (later described) with accumulators control signals (reset, write-enable . . . ) at a suitable timing based on the adjusted clock. These modules thus implement block 203 of FIG. 3.

Receiver scheduler 509 also receives as input a quantity, stored in memory 528, representative of the distance from a master reader, as provided in configuration step 410.

Receiver scheduler 509 also instructs the register or accumulator Acc1 508 when it has to transfer its contents to a plurality of De-spreader modules 510, 511, . . . 512. In another embodiment that does not use CDMA-DS techniques, blocks 510, 511, and 512 will be omitted. De-spreader module 510 receives as input the master spreading code stored at least temporarily in memory location 513, and is a multiplier that implements block 207 of FIG. 3. De-spreader modules 511, . . . 512 receive as input the spreading code of the tags 1 to Z, stored at least temporarily in memory locations 514, . . . 515, and are multipliers that implement blocks 209, 210 of FIG. 3.

The output of De-spreader modules 510, 511, . . . 512 is provided to a corresponding plurality of registers or accumulators AccM, Acc1-1, . . . Acc1-Z 516, 517, . . . 518, that implement blocks 208, 211, . . . 212 of FIG. 3.

The output of registers or accumulators AccM, Acc1-1, . . . Acc1-Z 516, 517, . . . 518 is provided to a corresponding plurality of threshold appliers 519, 520, that implement blocks 216, 219, . . . 220 of FIG. 3.

As far as the tag reading is concerned, the output of threshold applier 520 comprises an information bit line 521 carrying —when the threshold is overcome—the detected bit to a decoded bit memory or to an information bit consumer 522, that implements blocks 221, . . . 222 of FIG. 3.

Moreover, the output of registers or accumulators Acc1-1, . . . Acc1-Z 517, . . . 518 is further provided to a respective Fine TOA estimation module 523. The Fine TOA estimation module 523 determines the time slot, within each chip period, in which the pulses backscattered by the tag under consideration or by the master have been received, and possibly an even more precise instant within such time slot, e.g. an instant with a sub-nanosecond precision, such as with a precision of one eight of a nanosecond. This time information is provided to a ranging information consumer or memory 524 that implements block 227 of FIG. 3 to compute the distance of the tag under consideration from the reader under consideration.

The output of threshold applier 520, when the threshold is overcome, further comprises a line 525 carrying an information bit detected signal or flag that is used to control decoded bit memory or information bit consumer 522 and ranging information consumer or memory 524.

A branch for the obstacle detection comprising similar components may also be provided.

As far as synchronization is concerned, the output of threshold applier 519 is a line 525 carrying the Master Pulse Detected signal or flag, that implements block 218 of FIG. 3, to Clock Adjustment module 505, that implements block 217 of FIG. 3. In another embodiment, the Master Pulse Detected flag shall be activated when the master's unique identifier is contained in the information packet received. This can be implemented using a register that stores received information bits and compares them to the master's unique identifier expected or using an alternative implementation that will be clear to a skilled in the art.

Moreover, the output of De-spreader module 510 and related accumulator AccM 516 associated with the master spreading code is preferably further provided to a Fine offset estimation module 526. The Fine offset estimation module 526 determines the instant in which master pulses have been received within the expected e-th time slot, e.g. with a sub-nanosecond precision, such as with a precision of one eight of a nanosecond. Fine offset estimation module 526 can use several algorithms, including trigonometric transforms and/or algorithms that adopt a search-back window, which is used to mitigate the effects of multipath components and to increase the fine offset estimation precision. The output of Fine offset estimation module 526, fine offset 527, is provided to Clock Adjustment module 505 and used to further adapt the local clock of the slave reader to that of the master reader. The fine offset estimation is not represented in FIG. 3 for the sake of simplicity.

The Fine TOA estimation module 523 and/or the fine offset estimation module 526 can implement search back algorithms or other algorithms that are more complex than merely applying a threshold as described with reference to blocks 216, 219, 220 of FIG. 3, e.g. as algorithms disclosed in the above cited paper Dardari, D. et al., "Ranging With Ultrawide Bandwidth Signals in Multipath Environments", Proceedings of the IEEE, 97(2), 2 Feb. 2009, pages 404-426. These require the temporary storage of the energy accumulated in all the Nt time slots 35, as diagrammatically shown in FIG. 13. Indeed, it may happen that the time slot having the maximum energy is not that corresponding to the shortest path and thus to the distance of the tagged object 14, rather corresponds to a multiple path—thus longer, corresponding to an overestimate of the distance of the tagged object 14—that was however less attenuated than the shortest path because e.g. of a wall in the shortest path.

Thus, Clock Adjustment module 505 has the task of generating the adjusted clock signal 506 for the various components of the reader 12, adjusting the coarse clock 504 based on the timestamp or coarse synchronization 502, the master pulse detected flag 525, and preferably the output of Fine offset estimation module 526 when the reader is acting as a slave (block 217 of FIG. 3) or simply forwarding the coarse clock signal 504, possibly adjusted based on the coarse synchronization 502 or timestamp 502, when the reader is acting as a master. Based on this adjusted clock signal 506, the UWB pulse energy accumulation phases are driven, and the UWB pulse transmission is driven.

Clock Adjustment module 505 has two different behaviors based on the current phase. During the fine synchronization step 430, it adds the PrecLev delay to the local coarse clock 504 until the master UWB pulse sequence is found in the expected e-th time slot. During the normal execution phase or tag interrogation phase, when the local clock of the slave reader has already been synchronized with that of its master reader, Clock Adjustment module 505 has to mitigate possible clock drifts based on the temporal slot in which the master signal is detected, and possibly based on the instant within such slot in which the master signal is detected, as determined by Fine offset estimation module 526: when the Master pulse detected flag 525 becomes active, Clock Adjustment module 505 uses the output of Fine offset estimation module 526 to adapt its local clock to that of its master reader in order to compensate possible drifts. As said, in this case, the master signal UWB pulses are most probably received in a time slot adjacent to the expected e-th time slot.

Reader 12 finally comprises a UWB transmitter 530 or TX front-end module 530 that issues UWB pulses 34. A transmitter scheduler 531 controls the transmitter 530 and instructs it when it has to send the pulses and whether they should be positive or negative, according to the value of information bits of a packet to be transmitted 532 that is stored in a memory or generated runtime, as well as based on the value of bits of the reader's own spreading code 533 that is stored in a memory if the system uses the CDMA-DS technique. Thus, these modules implement blocks 202 of FIG. 3.

As said, Clock Adjustment module 505 issues the Adjusted Clock 506 to command the scheduling of UWB pulse transmission and pulse receiving. As stated in connection with block 432 of FIG. 9, during the initial set-up phase or first execution of fine synchronization step 430, a master reader 12 may activate the UWB transmission part only, namely modules 530-533, whereas a slave reader 12 may use the UWB reception modules dedicated to the synchronization only, i.e. not activating the modules of the branches dedicated to the tag reading (branches starting with modules 511, . . . 512).

During the initial set-up phase or first execution of fine synchronization step 430, moreover, the communication of UWB pulse sequences each corresponding to an information bit 30, 31 at a zero value may be continuous to shorten the synchronization phase, and to ensure that synchronism will eventually be reached even in case of very large offsets: if conversely the communication period contains the transmission of a packet followed by a silence, as disclosed above with respect to the normal operation phase, then a slave reader having an initial offset larger than the packet transmission time Tp*Np*Nc*Ns—which is avoided by coarse synchronization step 420 if present—could not reach synchronism.

During the initial set-up phase or first execution of fine synchronization step 430, a clock relay reader 124 alternates phases in which it activates the UWB reception modules dedicated to the synchronization to search for the signal transmitted by its master reader, and phases in which it distributes its own clock signal in its role as a master, by activating transmission modules 530-533 for transmitting UWB pulses 34.

Again, during the initial set-up phase or first execution of fine synchronization step 430, the search for reflected and backscattered pulse sequences issued by the reader itself can be avoided, especially when the tags 14 are not awakened by the continuous UHF signal.

The clock adjustment module 505 and step 217 can be implemented using several architectures. In one embodiment, not shown in detail, there can be an alteration of the voltage that drives the local oscillator.

A possible embodiment based on adaptation of the clock in the digital domain is shown in FIGS. 14-15. According to this embodiment, a clocked timer 600 performs a frequency division of the coarse clock 504, in order to obtain an adjusted clock 506 of a lower frequency. With reference to FIG. 16, lower part, within a master reader 12, the clocked timer undergoes a "fractional increment" by counting e.g. n=5 periods Tcoarse of the coarse clock 504 before changing the status of the output, so as to generate a clock signal 506 with a period Tmaster several times greater than the sub-clock period Tcoarse of the coarse clock signal 504.

In the specific case shown, Tmaster=th+tl=n*Tcoarse, with a duty-cycle of 50%, where th is the period of the clock high phase and tl is the period of the clock low phase.

Clocked timer 600 in a slave reader performs the frequency division of the coarse clock 504, based on an adaptable increment. Adaptable increment therein means that the slave clock is adaptable in sub-clock cycle steps with respect to the coarse clock 504 and thus to the master clock 506, according to the fractional measurements from the fine offset synchronization step 430.

Clocked timer 600 has the goal of merging together the coarse clock signal 504, and an increment "1+Δ" 601. The detailed merging operation will be described later with reference to FIGS. 15 and 16. The output of clocked timer 600 is the adjusted clock signal 506 that is distributed to all digital components in the reader 12. The increment "1+Δ" 601 is computed by adding to a value named "constant increment" 602 a fractional increment "Δ" 603 that has been computed according to the behavior of the clock of the master reader. Within a master reader 12, the fractional increment will always be null.

A more detailed FIG. 15 focuses on the computation of the increment. In this figure, the "adaptable increment" signal 604 that the "clocked timer" 600 has to undergo—e.g. the number of clock signals of the coarse clock 504—is obtained by multiplexing two signals in multiplexer 605. In particular, the multiplexer 605 is controlled by a selection signal "sel" 606. Said multiplexer 605 is used to select and provide to clocked timer 600 one of its two inputs: on the one hand, it is possible to apply a constant increment (by selecting the upper line) 602; on the other hand an adaptable increment "1+Δ" 601 can be applied (by selecting the lower line). Said adaptable increment 601 is computed by adding the fractional increment "Δ" 603, —which can be computed by analyzing the variations of the master's synchronization signal—, to a constant increment 602, similarly to what has been shown in FIG. 14.

As sketched out in FIG. 16, each reader (master and slave) executes with its own clock, thus the respective time bases differ by ±Δ, offset. As said, the clock adjustment 505 in the master reader runs unaltered, and generates a clock signal with a period Tmaster several times greater than the sub-clock period Tcoarse of the coarse clock signal 504.

On the other hand the clock adjustment 505 within the slave is adaptable, thus it increases of changeable quantities. As a consequence, the high phase of the resulting adjusted clock signal 506 could hold longer than the low phase or vice versa.

The clock period at the slave reader can be expressed as Tslave=th1+tl1=a*Tcoarse+b*Tcoarse, where nominally a=b, and a≠b during the slave reader clock adjustment. By way of an example, in FIG. 16 the high phase is kept to a constant number of periods of the coarse clock 504, while the adjustment occurs during the low phase, that is made to last a variable number of periods of the coarse clock 504.

The adjustment can only be performed when the master UWB pulse is detected and its time of arrival (the output of block 526 in FIG. 12B) is measured and compared to the local clock of the slave reader. Thus, during the synchronization the most of the time the clocks of the master reader and of the slave reader run with the same period but differ by ±Δ offset (not shown). Once a drift offset has been measured (left part of FIG. 16), the timer 600 in the slave reader is increased by a quantity 1+Δ in contrast to the uncompensated case (+1).

Tslave=n*Tcoarse=Tmaster if no master UWB pulse is detected (offset uncompensated).

Tslave=n*Tcoarse*(1+Δ)=Tmaster*(1+Δ) if drift offset is measured (slave clock adjustment).

E.g.: if −1% drift offset has been measured the timer is increased by +1.01 in contrast to the uncompensated case (+1).

By way of an example, in FIG. 16 the slave reader first lags behind the master reader by a +Δ offset of 2*Tcoarse. The slave's clocked timer 600 first (left part of the figure) increments by the constant increment 602 to provide the high phase th1 of 5*Tcoarse, then increments by the adjusted increment to provide the low phase tl1 of 2*T coarse in an attempt to compensate the +Δ offset of 2*Tcoarse. By so doing, the slave reader now leads the master reader by a −Δ offset of 1*Tcoarse. The slave's clocked timer 600 then (right part of the figure) increments by the constant increment 602 to provide the high phase th1 of 5*Tcoarse, then increments by the adjusted increment to provide the low phase tl1 of 6*T coarse, thus successfully compensating the −Δ offset of 1*Tcoarse.

After some measurements and adaptations, thus, the adjusted clock 506 at the slave reader shall then be adapted to the clock 506 that runs unaltered (with the constant increment +1) in the master reader, such that a common time base is available for the master reader and its slave readers. This time base can then be used to simultaneously start transmission of a packet.

This embodiment is easy to be implemented as it solely requires an adaptation of the clocked timer 600 in the digital domain. On the other hand, local frequency synthesis on the digital clock adjuster 505 described above may not have sufficient stability, i.e. sufficiently low drift and phase noise. Stability issues shall always be considered, and if required, more complex embodiment of the former can be adopted.

Instead of monitoring the expected e-th time slot and adjusting its clock by delaying it one time slot at a time until it receives the UWB pulse sequences from its master in the expected e-th time slot, a slave reader 12 can monitor all time slots and then adjust its clock by delaying it once only, by a number of time slots corresponding to the difference between the expected e-th time slot and the time slot in which the UWB pulse sequence from its master has been received.

A discussion of the performance of the synchronization system and method of the disclosure is now provided.

As discussed in connection with FIG. 11, a single preamble or payload symbol or information bit 30, 31 suffices for a slave reader 12 to understand whether it comes from the master reader 12 or not, because it encodes the master spreading code in the case of a system using CDMA-DS. A slave reader 12 has to receive the entire sequence of UWB pulses 34 that have been sent by its master reader 12 to transmit a preamble or payload symbol or information bit 30, 31 in order to be able to decode the transmitted symbol. Considering a spreading code of Nc bits, namely Nc chips 32, and Np pulses used to encode a chip, then Nps=Nc*Np is the total number of UWB pulses sent by the master to transmit a symbol. Hence, a slave reader has to receive all Nps pulses before it can de-spread the received information bit 30, 31. If the Nps pulses are not received starting from the first one of the UWB pulse sequence, due to asynchronous clocks between the master reader and the slave reader, a slave reader is unable to successfully demodulate the received symbol with the master's spreading code—apart from thresholding considerations as detailed above.

When a slave reader 12 is asynchronous with respect to its master reader 12, the synchronization time increases proportionally to the offset between the clocks of the two readers, or more specifically, with the delay of the slave reader 12 with respect to its master reader 12, wherein if the slave reader clock leads the master reader clock, it is considered to lag behind the master reader clock at the next symbol (or information packet) cycle.

Again, since synchronization pulses are expected to be sent at precise instants in time, i.e. within the expected e-th time slot, the presence of an offset between the two clocks could cause the slave reader 12 to expect the synchronization signal at the wrong instant. As a consequence, to guarantee that a slave reader 12 successfully detects a UWB pulse from its master reader or synchronization pulse, it is necessary that the slave reader completely inspects a pulse repetition period Tp for all possible clock offsets, by shifting the clock and thus the expected e-th time slot along the period Tp as disclosed.

The maximum synchronization time, or maximum set-up time, namely the time required to guarantee that all slave readers have achieved the synchronism, or that any slave reader that has the maximum clock offset has achieved the synchronism, in a preferred embodiment that uses CDMA-DS techniques is given by the following formula:

$$MaxTime = MaxOff/(PrecLev*Nf)*Nc*Np*Tp$$

wherein MaxOff is the maximum offset of the master and slave readers, PrecLev is the "granularity" with which the clock of the slave reader is delayed each time in the attempt to synchronize with the clock of the master reader, and the remaining symbols have the meaning used thus far. In the above formula, Nc*Np*Tp is the transmission time of an information bit 30, 31; the ratio expressed by MaxOff/PrecLev represents the maximum number of symbols or information bits 30, 31 that must be transmitted by the master reader to guarantee that a slave reader analyses or attempts all possible delays from the master reader clock in case of a single receiver or finger. It is noted that the finer the synchronization precision, i.e. the smaller PrecLev, the longer the set-up time, and that the more fingers, the shorter the set-up time.

When the coarse synchronization step 320 is not carried out, then the maximum offset is equal to an entire interrogation period or packet transmission period. With the preferred values provided above, one obtains MaxTime=1 second/1 nanosecond*1024*8*128 nanoseconds=about 290 hours. When synchronism is considered obtained at a symbol level, because the information packet need not be entirely decoded—e.g. the tag ID information may be dispensed with-, then MaxOff=1 millisecond and MaxTime is about 17 minutes.

When the coarse synchronization step 320 is carried out, then the maximum offset is equal to the worse coarse synchronization time, e.g. 200 microseconds in the case of a PTP software solution. With the preferred values provided above, one obtains MaxTime=200 microseconds/1 nanosecond*1024*8*128 nanoseconds=less than four minutes.

If the real-time UWB locating system 10 comprises clock relay readers such as the reader 124 of the system of FIG. 10, synchronization set-up time increases. Slave readers who have a clock relay reader as their master, such as readers 125-127 of cell 162 in FIG. 10, have to synchronize with their clock relay reader 124, which in turn has to synchronize with its own master reader 121. All slave readers 125-127 continuously apply a PrecLev delay such as a 1 nanosecond (1 nanosecond) delay to their internal clock until they cover the initial delay between their clock and the clock of the clock relay reader 124 acting as their master. The latter also acts as a slave reader, hence it will also modify its internal clock by continuously applying a PrecLev delay, until it receives pulses from its master reader 121. Hence, second order slave readers 125-127 will not be able to nullify the gap between their clocks and that of the clock relay reader 124 acting as their master because they all modify their internal timings. The gap may only be filled after the clock relay reader 124 has reached synchronism with its own master 121 and it can provide its slave readers 125-127 with a stable clock. The total number of symbols is equal to the number of symbols required to synchronize the readers in cell 1 plus the number of symbols required to synchronize the readers in cell 2, i.e. twice that required in the case of a single cell system 10 described above.

Therefore, in case of a two tier system or more in general in the case of a system of order M, the maximum synchronization time, or maximum set-up time is given by M*MaxTime.

During the normal operation of the real-time locating system 10, synchronism has to be maintained, because the clocks provided by the clock signal generator modules 503 of the various readers 12, and corrected by the clock adjustment module 505, will in almost all practical cases drift in time and/or become offset in time with respect to each other. Thus, fine synchronization step 430 is continuously executed, as stated above.

It should be recognized that the slave readers, concurrently with monitoring all time slots for a sequence of UWB pulses transmitted by themselves and backscattered by a tag 14 (or reflected by an obstacle), can easily continue to monitor at least periodically the expected e-th time slot for a sequence of UWB pulses transmitted by their master reader. When the sequence is correctly received, then nothing needs be done and the master pulse detected signal 525 (FIG. 12) is kept active. When the master's pulse sequence is not correctly received in the expected e-th time slot, the master pulse detected signal 525 is not issued and the clock adjustment module 505 adjusts the local clock so as to restore the synchronism, as detailed above.

In order to lower the probability of fake adjustments, at the expenses of increasing the time required for the synchronization phase to complete, it may be provided to wait at least two consecutive information bits 30, 31 successfully de-spread according to the master reader spreading code in block 216 of FIG. 3 instead of a single one as assumed thus far, before adjusting the local clock. The same consideration can be done for systems using CSMA-CA techniques. In this case, a reader can wait until it receives two or more consecutive packets containing its master's unique identifier before adjusting the clock.

While it is preferable that a slave reader is in LOS with its master reader, in case the area 16 does not allow such a configuration, or in order to lower the order M of the system, a slave reader may also not be in LOS with its master, provided that this is duly taken into account in the configuration step 401: the slave reader 12 should be provided with a distance master-slave that corresponds to the non-LOS shortest path from the master reader to it, possibly increased to take into account the lower speed of propagation of the UWB pulses 34 in the medium along that path.

Besides the location information, speed, direction and/or spatial orientation of the tagged items 14 can also be detected by the real-time UWB locating system according to the disclosure.

It is noted that use of a rake-like receiver also increases robustness of the system 10 against fading effects due to the multipath problem. Besides setting one finger to monitor the expected e-th time slot, corresponding to the shortest path from the master reader to the slave reader, one or more additional finger(s) may be set to additional time slot(s), corresponding to the other paths from the master reader to the slave reader. The energy of pulses received by the additional finger(s) may be accumulated together with the energy of pulses received by the one finger to increase the total energy received and thus increase the de-spreading precision.

The invention claimed is:
1. A UWB tag reader comprising:
a receiving module configured to receive UWB pulses,
   a memory storing a quantity representative of a distance between the UWB tag reader and a master UWB reader, and a master UWB reader unique identifier,
   a clock providing a reference clock signal that drives a UWB communication activity, the activity being based on a periodic transmission of a plurality of UWB pulses encoding a piece of information, each UWB pulse of the plurality of UWB pulses having a predetermined pulse period (Tp), and
   a clock adjuster that adjusts the reference clock signal until the UWB tag reader receives from the master UWB reader each UWB pulse of a sequence of UWB pulses transmitted by the master UWB reader, each UWB pulse of the sequence of UWB pulses having the predetermined pulse period (Tp), the sequence of UWB pulses encoding the master UWB reader unique identifier, each UWB pulse of the sequence of UWB pulses being received at an expected time slot within each predetermined pulse period (Tp), the expected time slot being related to the distance between the UWB tag reader and the master UWB reader.

2. The UWB tag reader of claim 1, wherein the master UWB reader unique identifier is a spreading code uniquely associated with the master UWB reader.

3. The UWB tag reader of claim 1, wherein the master UWB reader unique identifier is embedded in an information packet transmitted by the master UWB reader.

4. The UWB tag reader of claim 2, wherein the clock provides a clock signal on which a chip period divided into time slots (Tf) is based, and the clock adjuster adjusts the clock signal until the UWB tag reader receives each UWB pulse of the sequence of UWB pulses having the predetermined pulse period (Tp) and encoding the master UWB reader spreading code at an expected time slot within each of a plurality of chips.

5. The UWB tag reader of claim 2, wherein the clock adjuster adjusts the clock signal by shifting it by one time slot (Tf) every information bit transmission (Nc*Np*Tp).

6. The UWB tag reader of claim 2, wherein the UWB pulses having the predetermined pulse period (Tp) and encoding the master UWB reader spreading code comprise a plurality (Np) of successive equal pulses for each chip of the master device spreading code.

7. The UWB tag reader of claim 1, comprising the receiving module configured to receive UWB pulses having the predetermined pulse period (Tp) and to check whether they encode the master UWB reader unique identifier.

8. The UWB tag reader of claim 2, comprising the receiving module configured to monitor at least one time slot each chip period (Tc) and to accumulate energy of UWB pulses received in each of said at least one time slot (Tf) for each chip of the master UWB reader spreading code.

9. The UWB tag reader of claim 1, comprising a tag interrogation module and the clock adjuster is operated concurrently with or alternately with the tag interrogation module.

10. The UWB tag reader of claim 9, wherein the tag interrogation module comprises a transmitter of UWB pulses having the pulse period and encoding a UWB tag reader's own unique identifier.

11. The UWB tag reader of claim 7, wherein the receiving module is further adapted to check whether the received UWB pulses having the predetermined pulse period (Tp) encode the UWB tag reader's own unique identifier and modulated with a unique identifier of a tag.

12. The UWB tag reader of claim 1, wherein the clock adjuster comprises an input of a coarse synchronization signal.

13. A real-time UWB locating system comprising at least one UWB tag reader as claimed in claim 1 and at least one further UWB tag reader comprising a transmitter of UWB pulses having the predetermined pulse period (Tp) and encoding the master UWB reader unique identifier.

14. The system of claim 13, wherein the at least one further UWB tag reader cyclically transmits a series of sequences of UWB pulses having the predetermined pulse period (Tp) and encoding the master UWB reader unique identifier.

15. The system of claim 13, further comprising at least one tag comprising an antenna for backscattering UWB pulses, and a module configured to periodically set an antenna load according to a unique identifier, wherein the unique identifiers are spreading codes and a setting period corresponds to a chip period.

16. The system of claim 15, wherein each tag further comprises a module configured to periodically set an antenna load according to an information packet including a tag ID, a setting 'period corresponding to a symbol period (Ts) integer multiple of a chip period (Tc).

17. A UWB real-time locating system synchronization method comprising the steps of:
cyclically transmitting from a master UWB reader a sequence of UWB pulses encoding a master UWB reader unique identifier, each UWB pulse of the sequence of UWB pulses having a predetermined pulse period (Tp),
receiving at a slave UWB reader UWB pulses,
providing at the slave UWB reader a reference clock signal that drives a UWB communication activity, the activity being based on a periodic transmission of a plurality of pulses encoding a piece of information, each UWB pulse of the plurality of UWB pulses having a predetermined pulse period (Tp), and
adjusting the reference clock signal at the slave UWB reader until the slave UWB reader receives each UWB pulse of the sequence of UWB pulses, transmitted from a master UWB reader, each UWB pulse of the sequence of UWB pulses having the predetermined pulse period (Tp), each UWB pulse of the sequence of UWB pulses being received at an expected time slot within each predetermined pulse period (Tp), the expected time slot being related to a distance between the slave UWB reader and a master UWB reader.

18. The method of claim 17, wherein said unique identifiers are spreading codes and the step of adjusting comprises shifting the clock signal by a duration of one time slot (Tf) every information bit transmission (Nc*Np*Tp).

19. The method of claim 17, comprising a preliminary step of communicating to the slave UWB reader a coarse synchronization signal using a communication channel distinct from the UWB communication channel.

20. The method of claim 19, wherein the communication channel uses a software-based synchronization protocol.

21. A method of operating a real-time UWB locating system comprising a plurality of UWB readers and a plurality of tags, comprising the steps of:
providing to at least one UWB reader of the system a master UWB reader unique identifier and a quantity representative of a distance between the UWB reader and the master UWB reader,
periodically transmitting a tag interrogation signal from each UWB reader of the system, the tag interrogation signal comprising a predetermined number of pulses transmitted with a predetermined pulse period (Tp) and encoding a UWB reader's unique code,
receiving at each UWB reader a sequence of said predetermined number of UWB pulses having the predetermined pulse period (Tp),
checking whether the received sequence encodes a master UWB reader unique identifier, and in the affirmative case adjusting a clock signal of the receiving UWB reader so that each UWB pulse of the received sequence is received at an expected time slot within each predetermined pulse period (Tp), the expected time slot being related to a distance between the UWB reader and the master UWB reader.

22. The method of claim 21, wherein said unique identifiers are spreading codes and said step of periodically transmitting comprises periodically transmitting a tag interrogation packet from each UWB reader of the system, the tag interrogation packet comprising a plurality of information bits transmitted with an information bit period (Ts), each information bit being modulated by a UWB reader's own spreading code into a plurality of chips transmitted with a chip period (Tc), each chip being modulated into a predetermined number (Np) of pulses transmitted with a pulse period (Tp); and said step of checking comprises checking whether the received sequence encodes a master UWB reader spreading code, and in the affirmative case adjusting a clock signal of the receiving UWB reader so that each UWB pulse of the received sequence is received at an expected time slot within each chip, the expected time slot being related to a distance between the UWB reader and a master UWB reader.

23. The method of claim 21, further comprising checking whether the received sequence encodes the UWB reader's own unique identifier and in the affirmative case computing a distance from an item based on the time slot in which the sequence has been received.

24. The method of claim 21, further comprising receiving a plurality of UWB pulse sequences encoding the UWB reader's own unique identifier and checking whether the plurality of UWB pulse sequences further encodes a tag unique identifier and/or a tag ID.

* * * * *